United States Patent
Yu et al.

(10) Patent No.: US 9,088,820 B2
(45) Date of Patent: Jul. 21, 2015

(54) METHOD OF MANAGING CONTENTS TO INCLUDE DISPLAY OF THUMBNAIL IMAGES AND IMAGE DISPLAY DEVICE USING THE SAME

(75) Inventors: Chungeun Yu, Seoul (KR); Sanghyup Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 13/604,178

(22) Filed: Sep. 5, 2012

(65) Prior Publication Data

US 2013/0081083 A1    Mar. 28, 2013

(30) Foreign Application Priority Data

Sep. 27, 2011    (KR) .................. 10-2011-0097484

(51) Int. Cl.
| | |
|---|---|
| *H04N 5/445* | (2011.01) |
| *H04N 21/436* | (2011.01) |
| *H04L 12/28* | (2006.01) |
| *H04N 21/278* | (2011.01) |
| *H04N 21/442* | (2011.01) |
| *H04N 21/462* | (2011.01) |
| *H04N 21/482* | (2011.01) |
| *H04N 21/81* | (2011.01) |

(52) U.S. Cl.
CPC ...... *H04N 21/43615* (2013.01); *H04L 12/2812* (2013.01); *H04N 21/278* (2013.01); *H04N 21/44227* (2013.01); *H04N 21/4622* (2013.01); *H04N 21/482* (2013.01); *H04N 21/4826* (2013.01); *H04N 21/8133* (2013.01)

(58) Field of Classification Search
USPC ........ 725/14, 31, 39, 15–26, 44, 47; 386/200, 386/213–220; 348/24
See application file for complete search history.

(56) References Cited

U.S. PATENT DOCUMENTS

| | | | | |
|---|---|---|---|---|
| 6,957,395 | B1* | 10/2005 | Jobs et al. ...................... | 715/765 |
| 2005/0138193 | A1 | 6/2005 | Encarnacion et al. | |
| 2006/0015540 | A1* | 1/2006 | Takeda et al. ................. | 707/201 |
| 2006/0159109 | A1 | 7/2006 | Lamkin et al. ................ | 370/401 |
| 2007/0033288 | A1* | 2/2007 | Kim et al. ..................... | 709/230 |

(Continued)

FOREIGN PATENT DOCUMENTS

| | | |
|---|---|---|
| CN | 101686380 | 3/2010 |
| KR | 10-2008-0096341 A | 10/2008 |

(Continued)

OTHER PUBLICATIONS

Aijaz, Fahad et al. "Enabling Resource-oriented Mobile Web Server for Short-Lived Services"; Proceedings of the 2009 IEEE 9th Malaysia International Conference on Communications; Dec. 15-17, 2009; Kauala Lampur, Malaysia; pp. 392-396.

(Continued)

*Primary Examiner* — Jivka Rabovianski
(74) *Attorney, Agent, or Firm* — Ked & Associates, LLP

(57) ABSTRACT

Provided are a method of managing the contents and an image display device using the same. The method includes: obtaining contents information on each of a plurality of contents sources; displaying the obtained contents information on one screen as a plurality of lists that are differently configured according a plurality of classified items; and receiving meta information on at least one content in the contents lists and displaying the received meta information in correspondence to the content.

18 Claims, 28 Drawing Sheets

(56) References Cited

U.S. PATENT DOCUMENTS

| | | |
|---|---|---|
| 2008/0075431 A1* | 3/2008 | Moriya et al. ............... 386/95 |
| 2008/0168487 A1* | 7/2008 | Chow et al. ................. 725/31 |
| 2009/0031347 A1* | 1/2009 | Kidd ........................... 725/39 |
| 2009/0097748 A1* | 4/2009 | Lee et al. ................... 382/173 |
| 2009/0144158 A1* | 6/2009 | Matzelle et al. ............ 705/14 |
| 2009/0327241 A1 | 12/2009 | Douillet et al. |
| 2010/0077309 A1 | 3/2010 | Miyada |
| 2011/0107241 A1* | 5/2011 | Moore ........................ 715/760 |
| 2011/0107379 A1* | 5/2011 | Lajoie et al. ................ 725/87 |
| 2011/0191720 A1* | 8/2011 | Lee ............................. 715/838 |
| 2012/0198384 A1* | 8/2012 | Kumamoto ................. 715/786 |

FOREIGN PATENT DOCUMENTS

| | | |
|---|---|---|
| KR | 10-2009-0059490 A | 6/2009 |
| KR | 10-2011-0011020 A | 2/2011 |

OTHER PUBLICATIONS

European Search Report dated Dec. 12, 2012 issued in Application No. 12 18 3758.
Korean Office Action dated Jan. 9, 2013 issued in Application No. 10-2011-0097484.
Korean Notice of Allowance dated Aug. 19, 2013 issued in Application No. 10-2011-0097484.

* cited by examiner

```
<?xml version="1.0" encoding="UTF-8" standalone="yes" ?>
<search>
  <movieSize>1</movieSize>
<movie>
  <fileName>mulan.avi</fileName>
<movieInfo>
  <profileId>0</profileId>
  <titleId>28213</titleId>
  <localName>main title</localName>
  <engName>Eng title</engName>
  <orgName>Org title</orgName>
  <etcName>Sub title</etcName>
  <description>contents description</description>
  <runningTime>110min</runningTime>
  <makeYear>2009</makeYear>
  <genre>history narratives(069), drame(002)</genre>
<personList>
  <personSize>1</personSize>
<person>
  <roleType>1</roleType>
  <personRole>director</personRole>
  <personName>MA CHO SHING</personName>
    </person>
    </personList>
<imageList>
  <imageSize>2</imageSize>
<image>
  <imageType>1</imageType>
<imageUrl>http://image.cine21.com/cine21/poster/2010/0812/M0010002___.jpg</imageUrl>
  <imageKind>poster</imageKind>
    </image>
<image>
  <imageType>2</imageType>
<imageUrl>http://image.cine21.com/cine21/still/2010/0802/M0020057_VG26649.JPG</imageUrl>
  <imageKind>still cut</imageKind>
    </image>
    </imageList>   </movieInfo>   </movie>   </search>
```

METHOD OF MANAGING CONTENTS TO INCLUDE DISPLAY OF THUMBNAIL IMAGES AND IMAGE DISPLAY DEVICE USING THE SAME

CROSS-REFERENCE TO RELATED APPLICATIONS

The present application claims priority under 35 U.S.C. 119 and 35 U.S.C. 365 to Korean Patent Application No. 10-2011-0097484 filed on Sep. 27, 2011, which is hereby incorporated by reference in its entirety.

BACKGROUND

The present disclosure relates to a method of managing contents provided from contents sources connected to an image display device via a wired/wireless network.

As digital TVs having more excellent signal processing and storage capacity than typical analog TVs and also wired/wireless network technologies are commercialized, various kinds of contents services such as real-time broadcasting, Contents on Demand (COD), games, news, and video communication are allowed to be provided to users through an internet network connected to each home in addition to typical broadcast media.

As an example of a contents service provider using an internet network, IPTVs may be introduced. The IPTVs transmit various information services, video contents, and broadcasts to user's TVs via a high-speed internet network.

Additionally, image display devices such as digital TVs may share contents in p playback or stored therein with external image display devices such as other TVs, smart phones, PCs, and tablet PCs via a wired/wireless network.

SUMMARY

Embodiments provide a method of efficiently managing various contents provided from a plurality of contents sources via a wired/wireless network, and an image display device using the same.

In one embodiment, a method of managing contents includes: obtaining contents information on each of a plurality of contents sources; displaying the obtained contents information on one screen as a plurality of lists that are differently configured according a plurality of classified items; and receiving meta information on at least one content in the contents lists and displaying the received meta information in correspondence to the content.

In another embodiment, an image display device includes: a storage unit for storing contents information; a control unit for storing information on each of a plurality of contents sources in the storage unit, and constructing information on the plurality of contents with a plurality of contents lists according to at least two classified items; a display unit for displaying the plurality of constructed contents lists on one screen together with meta information on at least one content; and a network interface unit for receiving meta information on at least one content in the contents lists.

The details of one or more embodiments are set forth in the accompanying drawings and the description below. Other features will be apparent from the description and drawings, and from the claims.

BRIEF DESCRIPTION OF THE DRAWINGS

FIG. 28 is a view illustrating a configuration of metadata transmitted from a SDP server to an image display device according to an embodiment.

DETAILED DESCRIPTION OF THE EMBODIMENTS

The terms and words used in the specification and claims should not be interpreted as conventional or dictionary meanings, and thus, should be interpreted as meanings and concepts corresponding to the technical idea of the present invention, on the basis of the principle that the inventor may appropriately define the concept of the terms in the best way in order to describe his/her own invention.

Accordingly, the invention may, however, be embodied in many different forms and should not be construed as being limited to the embodiments set forth herein; rather, that alternate embodiments included in other retrogressive inventions or falling within the spirit and scope of the present disclosure can easily be derived through adding, altering, and changing, and will fully convey the concept of the invention to those skilled in the art.

Figure 1:
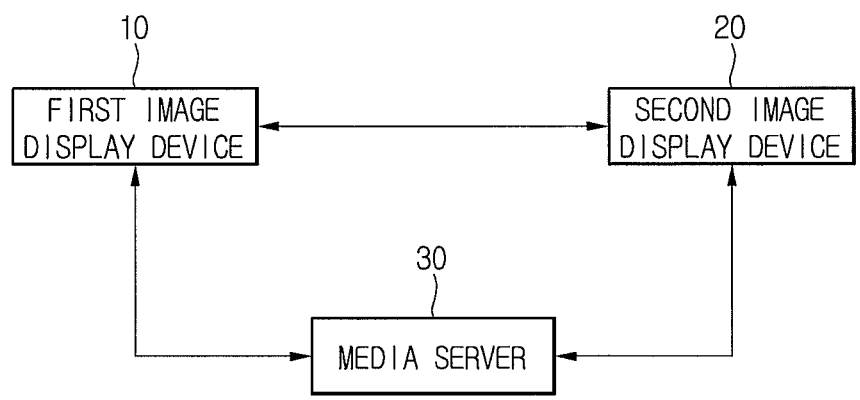
FIG. 1 is a block diagram illustrating a configuration of a remote control device according to an embodiment.

FIG. 1 is a block diagram illustrating a configuration of a contents sharing system according to an embodiment. The contents sharing system may include a plurality of image display devices 10 and 20.

Referring to FIG. 1, the first image display device 10 and the second image display device 20 are connected to each other via a wired/wireless network, and transmit/receive contents data, so that they share specific contents For example, the first and second image display devices 10 and 20 are connected to each other through various communication standards such as Digital Living Network Alliance (DLNA), Wireless Lan (WiFi), Wireless HD (WiHD), Wireless Home Digital Interface (WHDi), Blutooth, ZigBee, binary Code Division Multiple Access (CDMA), and Digital Interactive Interface for Video & Audio (DiiVA), and thus exchange data with each other.

Additionally, each of the first and second image display devices 10 and 20 is connected to a media server 30 via a wired/wireless network such as Internet, and shares contents by transmitting/receiving contents through the media server 30.

Moreover, each of the first and second image display devices 10 and 20 may be various devices such as a digital TV (for example, a network TV, an HBBTV, or a smart TV), a PC, a notebook computer, a mobile communication terminal (for example, a smart phone), and a tablet PC.

An 'N-screen' service, which continuously provides one content to various devices such as TVs, PCs, tablet PCs, and smart phones, may be provided through the contents sharing system described with reference to FIG. 1.

For example, a user may continuously view a broadcast or movie that the user previously viewed using a TV through another smart phone or tablet PC, and also may view additional information on a corresponding drama through a smart phone or tablet PC while viewing the drama in a TV.

With the above 'N-screen service, a contents file or a screen of the first and second image display devices 10 and 20 may be shared therebetween.

For this, the first image display device 10 may transmit contents, received from an external or stored therein, to the second image display device 20 at a user's request through the above various communication methods.

Additionally, as contents that a user purchases are stored in the media server 30, a user may play the contents in desired one of the first and second image display devices 10 and 20 as needed by downloading the contents from the media server 30 via Internet.

As shown in FIG. 1, the first and second image display devices 10 and 20 are connected to at leas tone contents source via a wired/wireless network, so that contents are received from the contents source and shared with each other.

For example, the contents source may be a storage device equipped in or connected to an image display device, a Network-Attached Storage (NAS), a Digital Living Network Alliance (DLNA), or a media server, but the present invention is not limited thereto.

Figure 2:
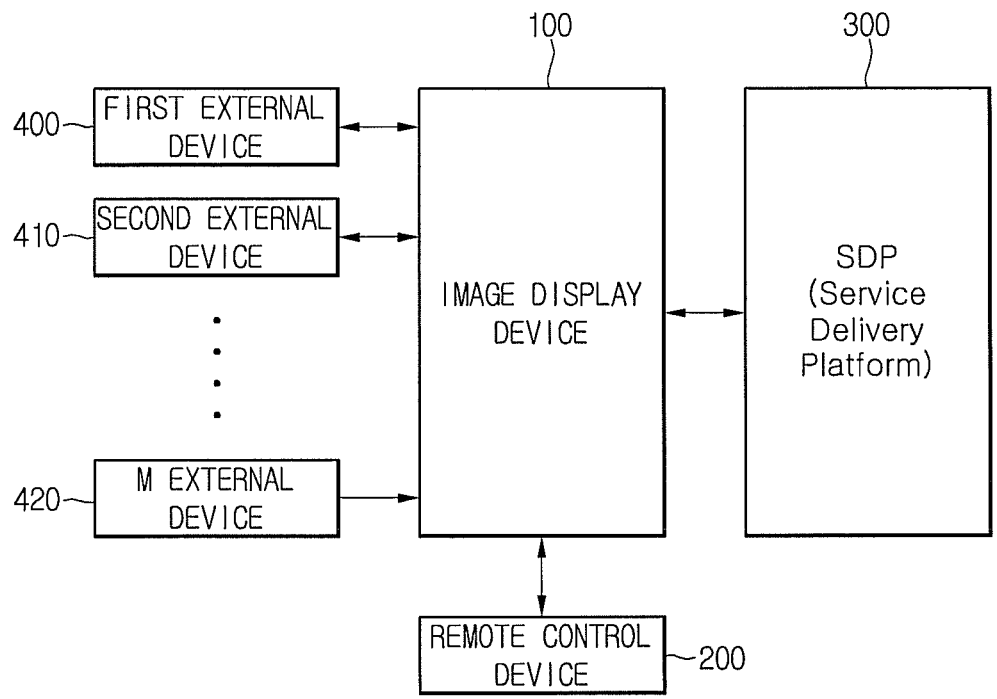
FIG. 2 is a block diagram illustrating a configuration of a contents management system according to an embodiment.

FIG. 2 is a block diagram illustrating a configuration of a contents management system according to an embodiment. The contents management system includes an image display device 100 and a plurality of contents sources 400, 410, and 420 for providing contents to the image display device 100.

Referring to FIG. 2, the image display device 100 is connected to the plurality of contents sources 400, 410, and 420 for providing contents to the image display device 100 and thus receives contents including image signals and sound signals. For this, the image display device 100 may include input/output terminals such as HDMI, USB, components, and RGB in order to transmit/receive data to/from the external devices 400, 410, and 420.

For example, the external devices 400, 410, and 420 may include various devices such as an image playback device (for example, a DVD player, Dvix player, and a Blu-ray player), a set top box (for example, an IPTV set top box, a cable set top box, or a satellite set top box), a PC, a game console, a home theater, a portable terminal, an HDD recorder, and a USB memory.

However, the external devices 400, 410, and 420 connected to the image display device 100 are not limited to the above devices, and may be any devices connected to the image display device 100 to transmit image signals.

For example, the external device may include various devices such as digital TVs, PCs, notebook computers, mobile communication terminals (for example, smart phones), tablet PCs, NAS equipment, DLNA servers, and media servers, which are connected to the image display device 100 via a wired/wireless network.

Additionally, the image display device 100 may receive broadcast signals through a tuner (not shown), or may receive contents from an external device through various communication standards such as WiFi, WiHD, WHDi, Blutooth, ZigBee, binary CDMA, and DiiVA, or may download contents from the media server 30 of FIG. 1 via internet.

Furthermore, as mentioned above, after contents received from an external are stored in a storage device (not shown) equipped in or connected to the image display device 100, they may be played at a user's request.

As shown in FIG. 2, the contents management system may include a Service Delivery Platform (SDP) 300 according to an embodiment.

The SDP maintains horizontal and common services in development, distribution authentication, billing, and messaging of services provided from Contents Providers (CPs) or Service Providers (SPs), and also integrates and develops them.

The image display device 100 requests metadata including detailed information on specific contents to the SDP server 300, and provides various information on contents to a user by receiving the requested metadata from the SDP server 300.

For example, the image display device 100 may receive metadata including movie title, director, actors, or plot information on specific video contents from the SDP server 300, and may display them on a screen.

Figure 3:
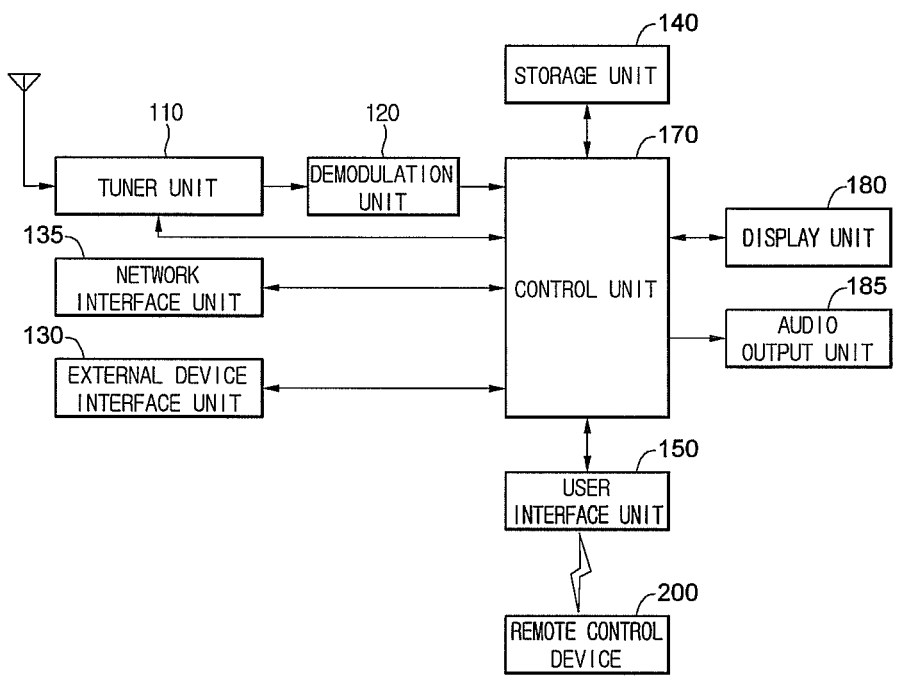
FIG. 3 is a block diagram illustrating a configuration of an image display device according to an embodiment.

FIG. 3 is a block diagram illustrating a configuration of an image display device according to an embodiment. The image display device 100 includes a broadcast receiving unit 130, an external device interface unit 135, a storage unit 140, a user input interface unit 150, a control unit 170, a display unit 180, an audio output unit 185, and a power supply unit 190. Moreover, the broadcast receiving unit 130 may include a tuner 131, a demodulation unit 132, and a network interface unit 133.

Referring to FIG. 3, the tuner 131 may select an RF broadcast signal corresponding to a channel selected by a user or all pre-stored channels among Radio Frequency (RF) broadcast signals received through an antenna, and may convert the selected RF broadcast signal into an intermediate frequency signal or a base band image or sound signal.

The demodulation unit 132 may receive the digital IF signal DIF converted by the tuner 131, and then, may perform a demodulation operation thereon. For example, if the digital IF signal outputted from the tuner 131 is the ATSC format, the demodulator 132 may perform an 8-Vestigal Side Band (8-VSB) demodulation operation.

Additionally, the demodulation unit 132 may perform channel decoding, and for this, may include a Trellis Decoder, a De-interleaver, and a Reed Solomon Decoder in order to perform Trellis decoding, de-interleaving, and Reed Solomon decoding.

The demodulation unit 132 may output a stream signal TS after performing the demodulation and channel decoding, and the stream signal may be a signal into which an image signal, sound signal, or a data signal is multiplexed.

For example, the stream signal may be an MPEG-2 Transport Stream (TS) into which an MPEG-2 standard image signal and a Dolby AC-3 standard sound signal are multiplexed. In more detail, the MPEG-2 TS may include a 4 byte header and a 184 byte payload.

The stream signal outputted from the demodulation unit 132 may be inputted to the control unit 170. The control unit 180 may output an image to the display unit 180 and a sound to the audio output unit 185 after demultiplexing and processing the image/sound signal.

The external device interface unit 135 may connect an external device and the image display device 100, and for this, may include an A/V input/output unit (not shown) or a wireless communication unit (not shown).

The external device interface unit 135 may be used for wired/wireless connection of an external device such as a Digital Versatile Disk (DVD) player, a Bluray player, a game console, a camera, a camcorder, and a computer (for example, a notebook computer).

Moreover, the external device interface unit 135 may deliver an image, sound, or data signal inputted from a connected external into the control unit 170 of the image display device 100, and may output the image, sound, or data signal processed in the control unit 170 into the connected external device.

The A/V input/output unit may include a USB terminal, a Composite Video Banking Sync (CVBS) terminal, a component terminal, an S-video terminal (i.e., an analog type), a Digital Visual Interface (DVI) terminal, a High Definition Multimedia Interface (HDMI) terminal, an RGB terminal, and a D-SUB terminal, in order to input image and sound signals of an external device into the image display device 100.

Furthermore, the wireless communication unit may perform a short-range wireless communication with another electronic device. For example, the image display device 100 and another electronic device may be connected to a network through communication standards such as Bluetooth, Radio Frequency Identification (RFID), infrared Data Association (IrDA), Ultra Wideband (UWB), ZigBee, and Digital Living Network Alliance (DLNA).

Moreover, the external device interface unit 135 is connected to various set top boxes through at least one of the above various terminals in order to perform an input/output operation of a set top box.

In addition, the external device interface unit 135 may receive applications or lists of applications in an adjacent external device, and then may deliver them to the control unit 170 or the storage unit 140.

The network interface unit 133 may provide an interface for connecting the image display device 100 to a wire/wireless network including an internet network. For example, the network interface unit 133 may include an Ethernet terminal for accessing a wired network or may be connected to a wireless network through communication standards such as WiFi, WiHD, WHDi, Blutooth, ZigBee, binary CDMA, DiiVA, Wibro, Wimax, and HSDPA.

Moreover, the network interface unit 133 may transmit/receive data to/from another user or another electronic device via a connected network or another network linked to the connected network.

Additionally, the network interface unit 133 may transmit some contents data stored in the image display device 100 to a selected user or electronic device among users or other electronic devices pre-registered in the image display device 100.

The network interface unit 133 may access a predetermined web page via a connected network or another network linked to the connected network. That is, the network interface unit 133 may access a predetermined web page via a network to transmit/receive data to/from a corresponding sever.

Then, the network interface unit 133 may receive contents or data provided from a CP or a network operator. That is, the network interface unit 133 may receive contents such as movies, advertisings, games, VODs, and broadcast signals and information thereon, which are provided from a CP or a network provider via a network.

Additionally, the network interface unit 133 may receive update information and update files of a firmware provided from a CP or a network operator, and may transmit data to an internet provider, a CP, or a network operator.

The network interface unit 133 may select and receive a wanted application from applications open to air via a network.

The storage unit 140 may store a program for processing and controlling each signal in the control unit 170, and may store the processed image, sound or data signals.

Moreover, the storage unit 140 may perform a function for temporarily storing image, sound or data signals inputted from the external device interface unit 135 or the network interface unit 133, and may store information on a predetermined broadcast channel through a channel memory function.

The image display device 100 may play contents files stored in the storage unit 140 such as movie files, still image files, music files, document files, and application files, and then, may provide them to a user.

The user input interface unit 150 may deliver a signal that a user inputs to the control unit 170 or may deliver a signal from the control unit 170 to a user. For example, the user input interface unit 150 may receive a control signal such as power on/off, channel selection, and screen setting from a remote control device 200 and may process the received control signal according to various communication methods such as an RF communication method or an IR communication method. Or, the user input interface unit 150 may transmit a control signal from the control unit 170 to the remote control device 200.

Additionally, the user input interface unit 150 may deliver to the control unit 170 a control signal inputted from a local key (not shown) such as a power key, a channel key, a volume key, and a setting key.

For example, the user input interface unit 150 may deliver to the control unit 170 a control signal inputted from a sensing unit (not shown) that senses a gesture of a user, and may transmit a signal from the control unit 170 to a sensing unit (not shown). Moreover, the sensing unit (not shown) may include a touch sensor, a sound sensor, a position sensor, and a motion sensor.

The control unit 170 may demultiplex a stream inputted from the tuner 131, the demodulation unit 132, or the external device interface unit 135, or may process demultiplexed signals in order to generate and output a signal for image or sound output.

The image signal processed in the control unit 170 is inputted to the display unit 180, and then, is displayed as an image corresponding to a corresponding image signal. Additionally, the image signal processed in the control unit 170 is inputted to an external output device through the external device interface unit 135.

The sound signal processed in the control unit 170 may be outputted to the audio output unit 185 as audio. Moreover, the sound signal processed in the control unit 170 is inputted to an external output device through the external device interface unit 135.

Although not shown in FIG. 3, the control unit 170 may include a demultiplexing unit and an image processing unit.

Besides that, the control unit 170 may control overall operations of the image display device 100. For example, the control unit 170 controls the turner 131 to tune an RF broadcast corresponding to a channel that a user selects or a pre-stored channel.

Additionally, the control unit 170 may control the image display device 100 through a user command inputted through the user input interface unit 150 or an internal program, and may access a network to download applications that a user wants or lists of applications into the image display device 100.

For example, the control unit 170 controls the turner 131 to receive a signal of a selected channel according to a predetermined channel selection command received through the user input interface unit 150, and may process an image, sound, or data signal of the selected channel.

The control unit 170 may output channel information that a user selects in addition to a processed image or sound signal through the display unit 180 or the audio output unit 185.

Moreover, the control unit 170 may output an image or sound signal of an external device such as a camera or a camcorder, which is inputted through the external device interface unit 135, into the display unit 180 or the audio output unit 185 according to an external device image playback command received through the user input interface unit 150.

Furthermore, the control unit 170 may control the display unit 180 to display an image, and for example, the control unit 170 may control the display unit 180 to display a broadcast image inputted through the tuner 131, an external input image inputted through the external device interface unit 135, an image inputted through a network interface unit, or an image stored in the storage unit 140. In this case, an image displayed on the display unit 180 may be a still or moving image or a 2D or 3D image.

Additionally, the control unit 170 may play contents stored in the image display device 100, received broadcast contents, or external input contents inputted from an external. The contents may have various formats such as a broadcast image, an external input image, an audio file, a sill image, an accessed web page, and a document file.

According to an embodiment, the image display device 100 integrates and manages contents provided from a plurality of contents sources in one screen, regardless of contents sources. Also, the image display device 100 may receive metadata on specific contents among the contents from the SDP 300, and then, may provide various information thereon to a user.

Hereinafter, a method of managing contents according to an embodiment will be described with reference to FIGS. 4 to 7.

Figure 4:
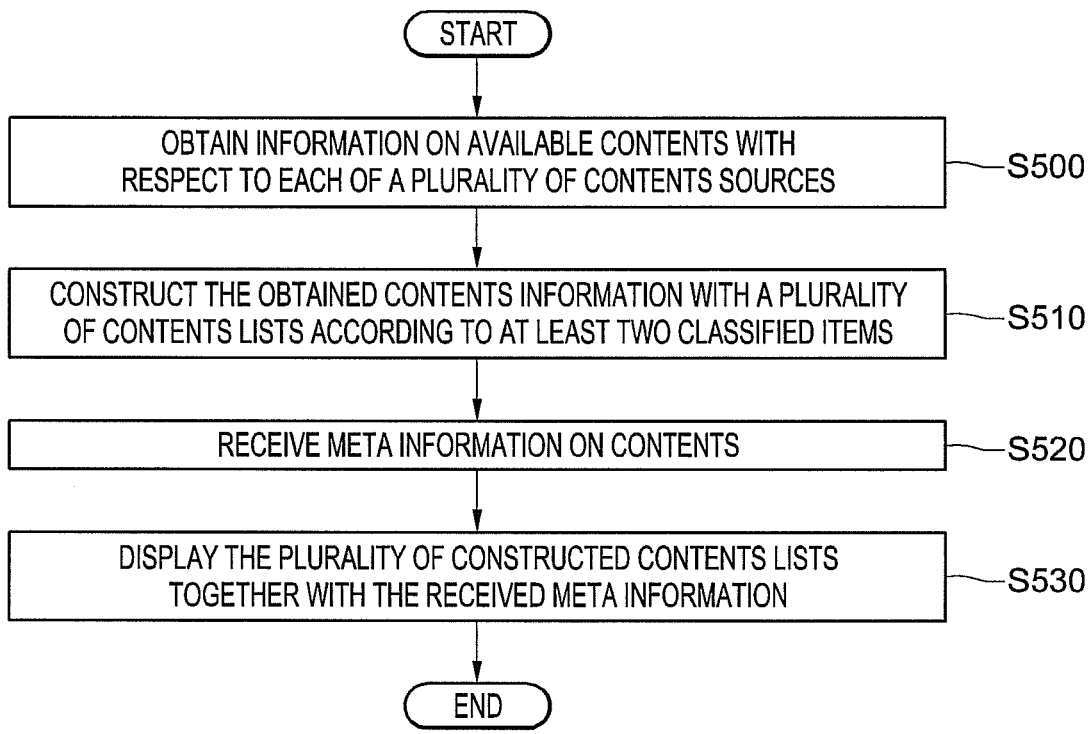
FIG. 4 is a flowchart illustrating a method of managing contents according to an embodiment.

FIG. 4 is a flowchart illustrating a method of managing contents according to an embodiment. The method will be described with reference to the block diagrams of FIGS. 2 and 3.

Referring to FIG. 4, the image display device 100 obtains information on available contents with respect to each of a plurality of contents sources in operation S500.

For example, the control unit 170 of the image display device 100 searches for contents in each contents source connected to the image display device 100 in order to store information on the searched contents in the storage unit 140, and also periodically performs contents search on a plurality of contents sources in order to update contents information stored in the storage unit 140 according to a search result.

Then, the control unit 170 of the image display device 100 constructs the obtained contents information with a plurality of contents lists according to at least two classified items in operation S510.

For example, the control unit 170 constructs a list of available contents from the plurality of contents sources by using the contents information obtained in operation S500. Accordingly, the constructed contents list is not limited to a specific contents source, and thus, includes all available contents that a user can select in the image display device 100.

Additionally, the constructed contents list may be displayed on one screen of the display unit 180, and thus, a user may integrally mange various contents provided from a plurality of contents sources, regardless of contents sources (for example, selecting, playing, or transmitting contents in one screen).

Figure 5:
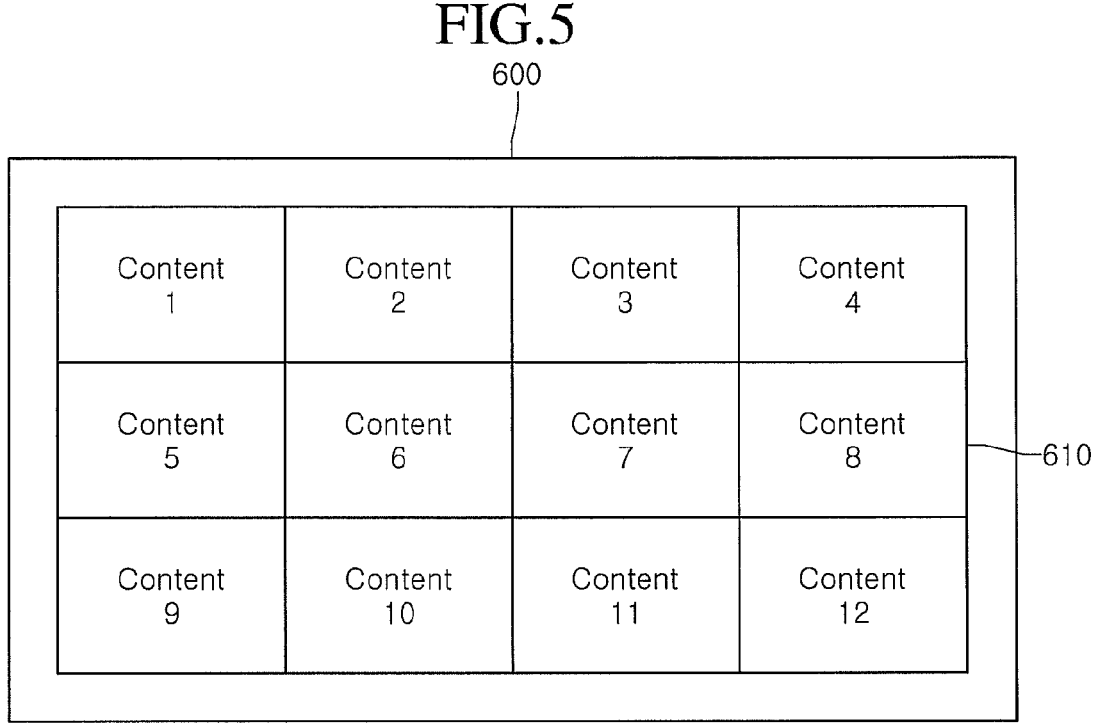
FIGS. 5 to 7 are views illustrating configurations of a contents list according to embodiments.

Referring to FIG. 5, the contents list 610 including information on a plurality of contents may be displayed on the screen 600 of the image display device 100, and 'Content 1' to 'Content 12' in the contents list 610 may be contents provided from a plurality of contents sources.

For example, 'Content 1', 'Content 3', and 'Content 4' are contents provided from a first contents source. 'Content 2', 'Content 7', and 'Content 8' are contents provided from a second contents source. The contents may be aligned according to a predetermined standard, and then, may be displayed in the contents list 610.

Figure 6:
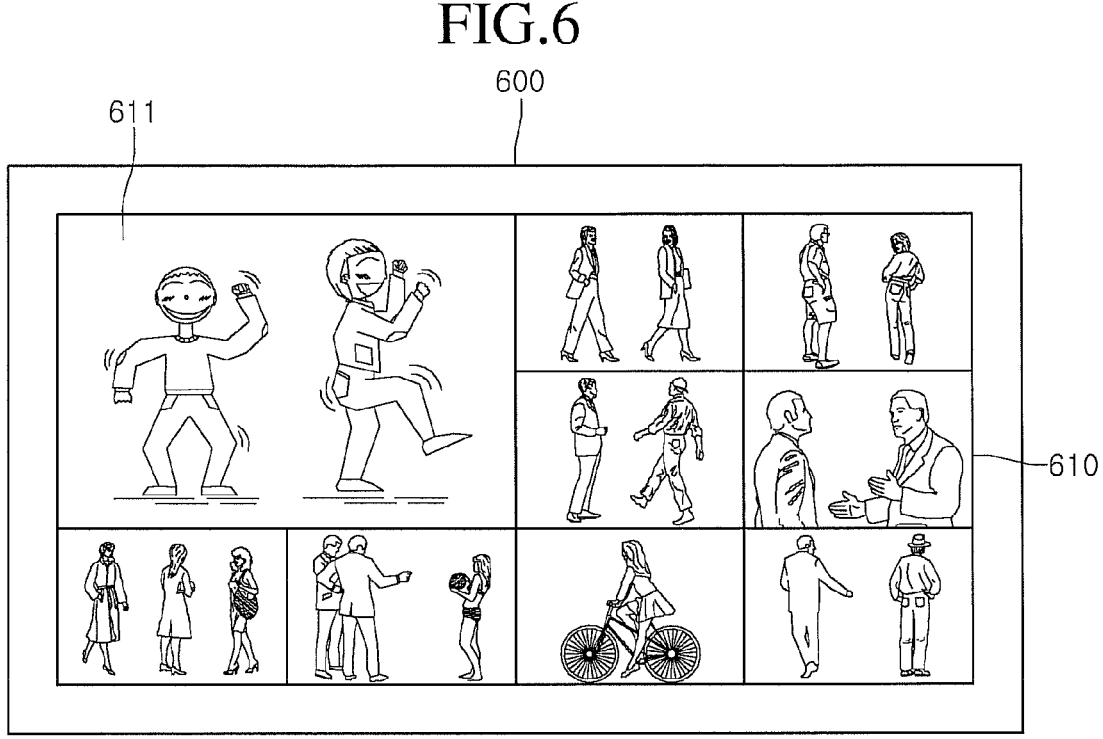

Additionally, as shown in FIG. 6, the contents information in the contents list 610 may be a thumbnail image representing corresponding contents. For example, a thumbnail image may be an image obtained by reducing an image in video contents to the display area size of the contents list 610.

Moreover, one 611 of contents thumbnail images in the contents list 610 may be displayed larger then other images, and the displayed position or size of each thumbnail image is determined according to predetermined standards (or, user's settings).

Furthermore, the above contents list may include a plurality of different lists according to classified items such as recommended contents, recently played contents, recently added contents, preferred contents, and contents type.

That is, contents provided from a plurality of contents sources may be represented as a plurality of contents lists corresponding to each of a plurality of predetermined classified items. Since the plurality of contents lists classify and align contents, provided from the plurality of contents sources, according to the standard based on different classified items, they may include contents of different groups.

Figure 7:
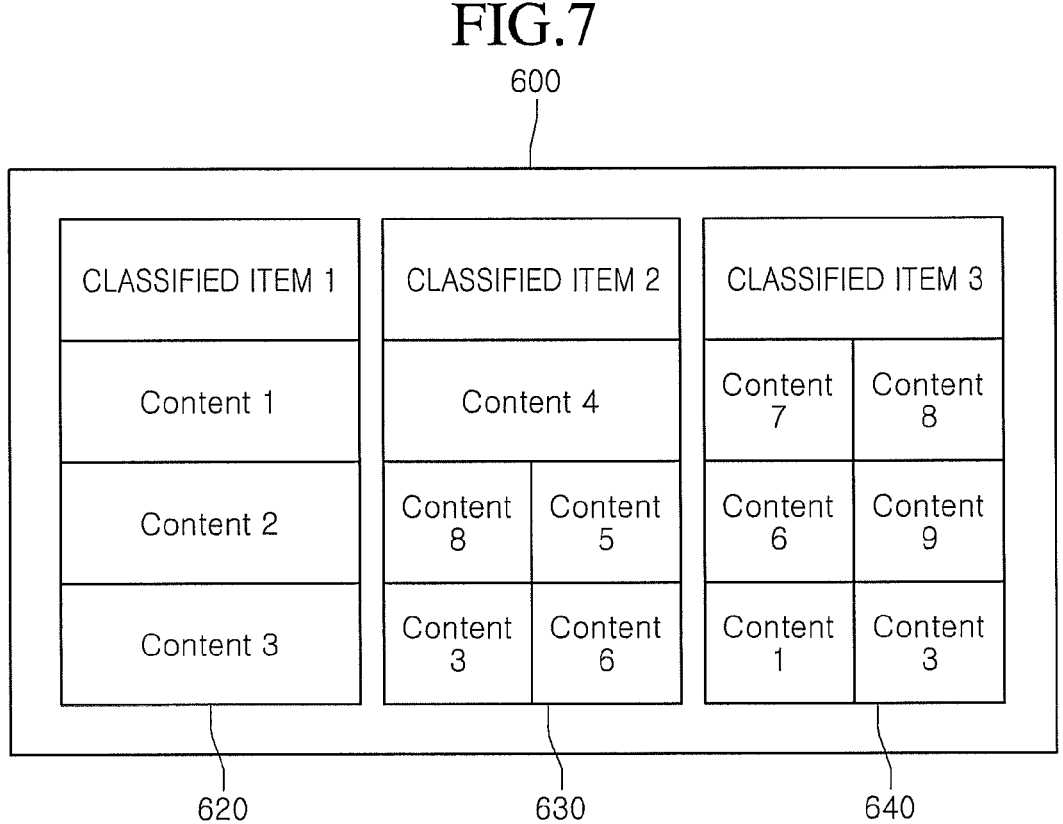

Referring to FIG. 7, a plurality of contents lists 620, 630, and 640 corresponding to respective 'classified item 1', 'classified item 2', and 'classified item 3' may be simultaneously displayed on the screen 600 of the image display device 100.

For example, the first contents list 620 may include 'Content 1', 'Content 2', and 'Content 3' classified and aligned according to the 'classified item 1' among contents provided from a plurality of contents sources.

Additionally, the second contents list 630 may include 'Content 3', 'Content 4', 'Content 5', and 'Content 6' classified and aligned according to the 'classified item 2' among contents provided from a plurality of contents sources.

Furthermore, the third contents list 640 may include 'Content 1', 'Content 3', 'Content 6', 'Content 7', 'Content 8', and 'Content 9' classified and aligned according to the 'classified item 3' among contents provided from a plurality of contents sources.

As shown in FIG. 7, the number of contents in a contents list and the size of an area where each contents information is displayed may set differently according to a classified item. This also may vary depending on a user's input.

Additionally, as 'Contents 3' is included in the first contents list 620 and the second contents list 620 simultaneously, a plurality of contents lists configured according to at least two classified items may commonly include specific contents.

The image display device 100 receives meta information on contents in operation S520, and displays the plurality of configured contents lists in addition to the received meta information in operation S530.

For example, the network interface unit 135 of the image display device 100 may request metadata transmission on video contents in the contents list to the SDP server 300, and then may receive the metadata on the video contents from the SDP server 300.

Furthermore, the metadata received from the SDP server 300 may include meta information such as the title, director, actors, and plot of the video contents, and the meta information may be displayed on a contents list in correspondence to corresponding contents.

For example, as shown in FIG. 7, if the 'Content 1' in the first contents list 620 corresponding to the 'classified item 1' is a movie, the network interface unit 135 requests the transmission of metadata on the 'Content 1' to the SDP server 300, and then, receives meta information on the movie title, director, actors, or plot of the 'Content 1' from the SDP server 300.

Furthermore, the received metadata on the 'Content 1' may be displayed together with the thumbnail image of the 'Content 1' in the first contents list 620.

As described with reference to FIGS. 4 to 7, according to an embodiment, a user may integrally manage contents provided from a plurality of contents sources in one screen of the image display device 100, regardless of contents sources, and also, together with that, may easily confirm contents meta information provided from the SDP server 300 on the screen, regardless of an additional search process.

Hereinafter, referring to FIGS. 8 to 25, embodiments for a method of configuring and managing contents provided from a plurality of contents sources by a plurality of contents lists according to at least two classified items.

Figure 8:
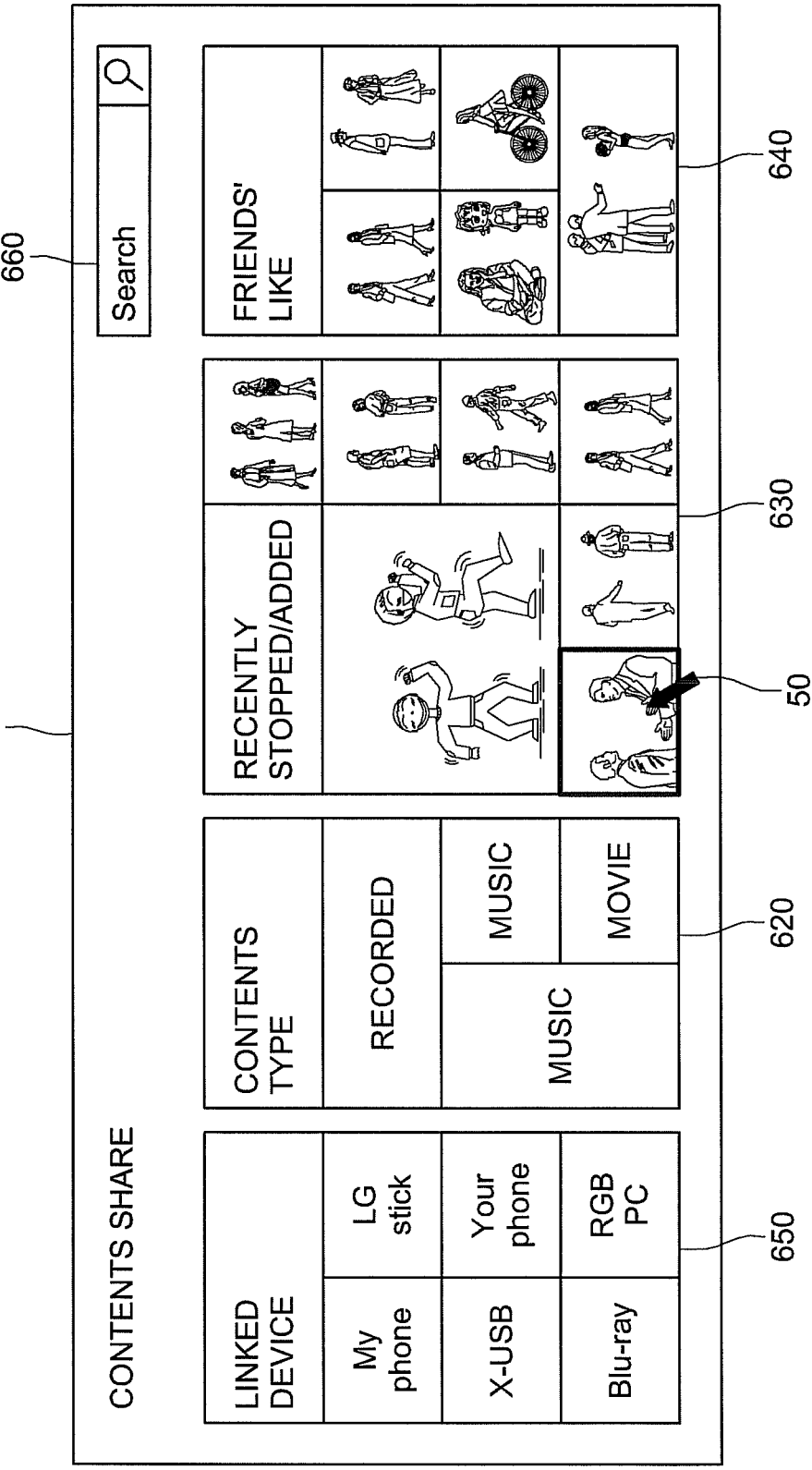
FIG. 8 is a view illustrating a method of constructing and displaying a plurality of contents lists according to at least two classified items according to an embodiment.

Referring to FIG. 8, the image display device 100 may display a 'CONTENTS SHARE' User Interface (UI) on the screen 600 in order to share contents with external devices at a user's request.

The 'CONTENTS SHARE' UI includes a plurality of contents lists 620, 630, and 640 configured by at least two classified items, as described with reference to FIGS. 4 to 7, and a list 650 of external devices connectible to the image display device 100.

That is, a 'CONTENTS TYPE' item is to classify a list of contents provided from a plurality of contents sources by the types of the corresponding contents. A 'RECENTLY STOPPED/ADDED' item is to provide the list of contents provided from the plurality of contents sources according to a recently-played or added order. A 'FRIENDS' LIKE' item is to provide a contents list according to a contents preference (in more detail, whether it is recommended by friends).

For example, the 'CONTENTS TYPE' item may display contents provided from a plurality of contents sources as a contents type list 620, which classifies the contents into contents recorded in the image display device 100 (RECORDED), photo contents (PHOTO), music contents (MUSIC), and movie contents (MOVIE).

The 'RECENTLY STOPPED/ADDED' item may be displayed as the recent contents list 630 including contents, which are the most recently stopped or added in the image display device 100, among the contents provided from the plurality of contents sources.

For example, the most recently stopped or added contents are selected by a predetermined number from contents stopped during playback or newly added to the 'CONTETS SHARE' UI. One content that is the most recently stopped among the selected stopped/added contents may be displayed greater than other contents in the recent contents list 630.

Moreover, a plurality of thumbnail images in the recent contents list 630 may be stored in advance in the storage unit 140 so that they may be displayed without delay. Contents stopped or added on the same date may be grouped and displayed.

The 'FRIENDS' LIKE' item may be displayed as the recommended contents list 640 including contents that friends recommend through a contents sharing service provided via internet among contents provided from a plurality of contents sources.

Moreover, a user may select at least one from the contents in the contents lists 620, 630, and 640, and then, may play it or transmit it to an external device. For this, a pointer displayed on the screen 600 may be moved or a highlighted box may be moved in order to select a specific content by using a remote control device200.

A 'LINKED DEVICE' item may be displayed as the connected device list 650 including a plurality of contents-sharing external devices connected to the image display device or connected according to a user's input.

Additionally, a user may input a search word in a search object 660 displayed on the screen 600 in order to search for a desired content from contents provided from a plurality of sources.

Figure 9:
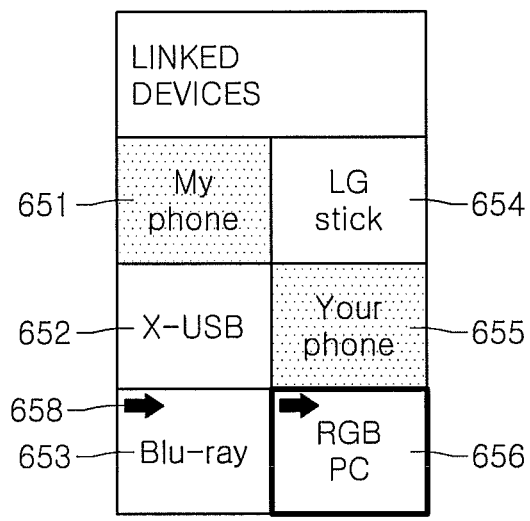
FIGS. 9 to 11 are views illustrating a method of displaying a 'LINKED DEVICE' list shown in FIG. 8 according to embodiments.
Figure 10:
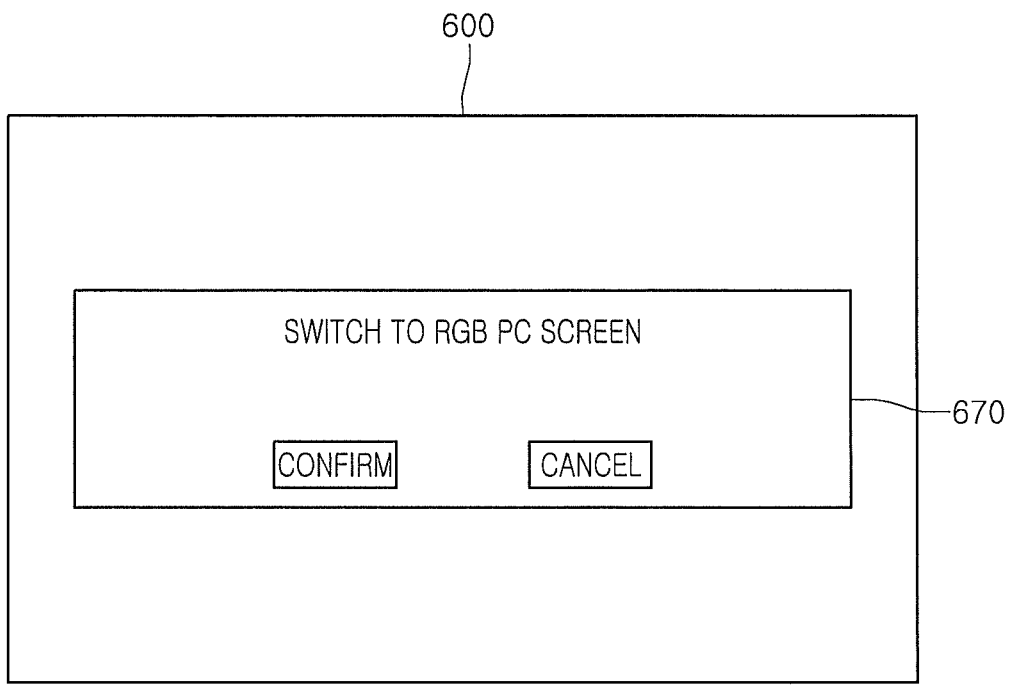
Figure 11:
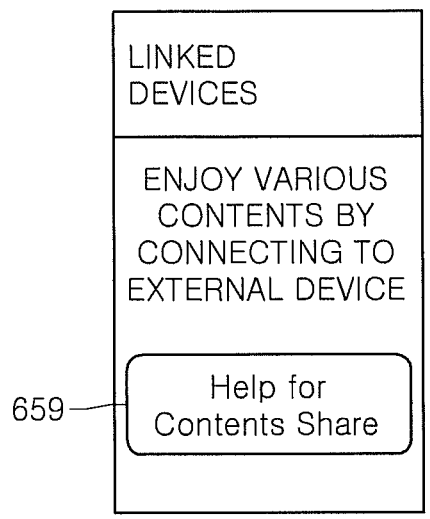

FIGS. 9 to 11 are views illustrating a method of displaying the connected device list 650 corresponding to the 'LINKED DEVICES' item according to embodiments.

Referring to FIG. 9, the connected device list 650 may include a plurality of external devices connectible to the image display device 100 such as 'My phone' 651, 'LG stick' 652, 'X-USB' 653, 'Your phone' 654, 'Blu-ray' 655, and 'RGB-PC' 656.

External devices in the connected device list 650 may be displayed to be distinguished from each other by using a device name and icon, or may be displayed with different color cells according to a device type (for example, a storage device, a portable terminal, a playback device, or a server).

A user may select one of the external devices 651 to 656 in the connected device list 650, and then, may receive contents from the selected external device and play them, or may transmit contents to the selected external device in order to share the contents.

Additionally, devices for inputting contents in connection with the image display device 100 via a wired/wireless network, for example, 'Blu-ray' 655 and 'RGB-PC' 656, may be displayed with an input device icon 658 for representing an input device.

When a user selects the 'RGB-PC' 656 displayed with the input device icon 658, as shown in FIG. 10, a popup window 670 for notifying that a screen of the image display device 100 switches to a screen of the selected RGB-PC may be displayed on the screen 600.

When a user selects 'confirm' from the popup window 650 as shown in FIG. 10, data corresponding to contents currently played in the RGB-PC are inputted to the image display device 100, so that the screen of the RGB-PC may be shared in the image display device 100.

Moreover, external devices displayed in the connected device list 650 may be determined according to a predetermined priority order. For example, according to the priority order such as the order of devices connected within the last two weeks, devices connected using USB, DLNA, and WiFi direct, devices connected using WiFi display, devices connected using DiiVa, input devices, and power-off devices, external devices may be selected by a predetermined number, and then, arranged.

A device that requires authentication among external devices in the connected device list 650 (for example, a server that requires authentication for wireless network connection such as WiFi display or WiFi direct) may be displayed with an additional icon in order to represent whether the authentication is successful.

Referring to FIG. 11, when there is no device to be displayed in the connected device list 650 because there is no external device connected to the image display device 100, a 'Help for Contents Share' button 659 for setting a connection with an external device may be displayed in the connected device list 650.

Figure 12:
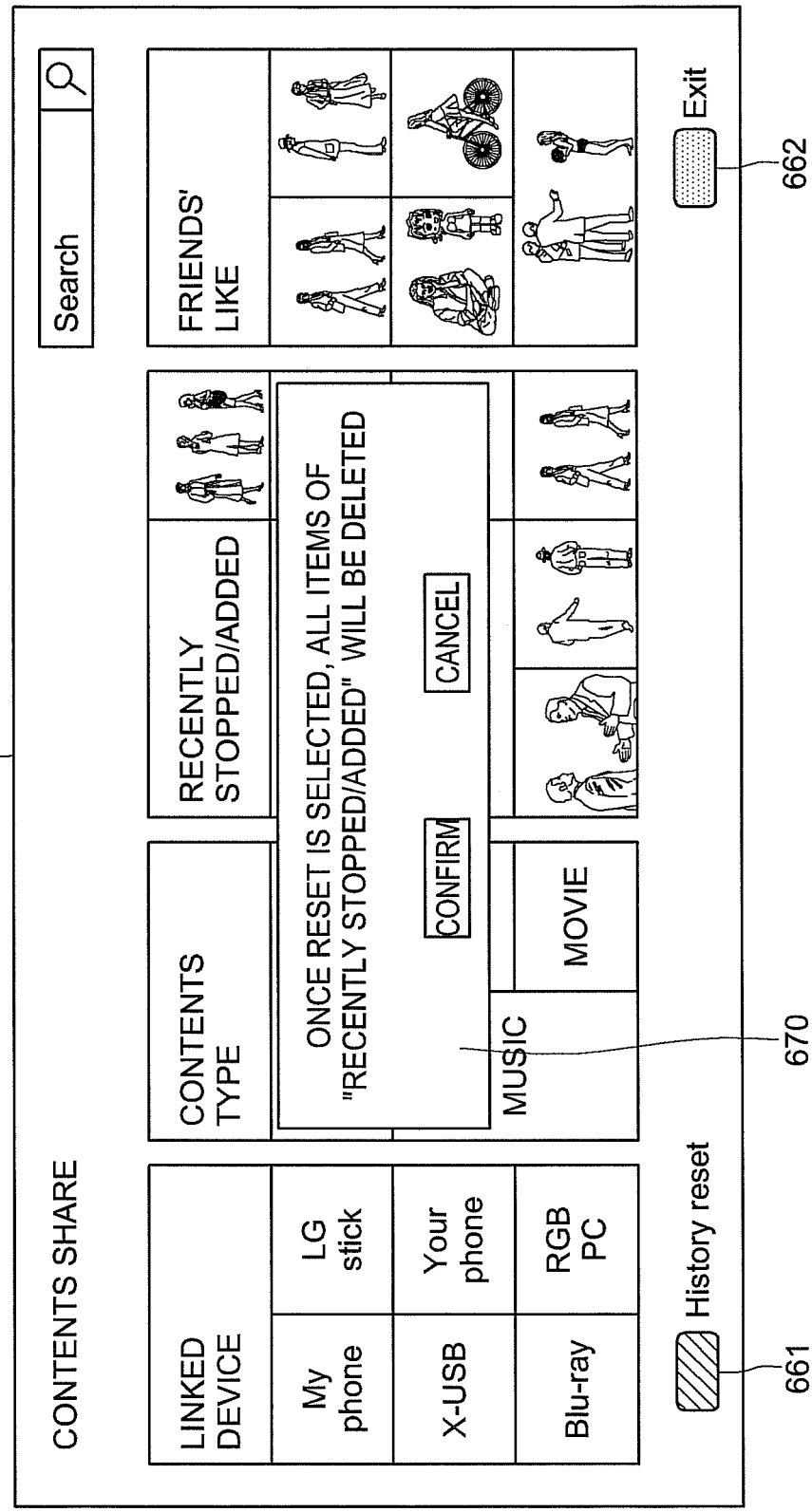
FIGS. 12 to 13 are views illustrating a method of displaying a 'RECENTLY STOPED/ADDED' list shown in FIG. 8 according to embodiments.
Figure 13:
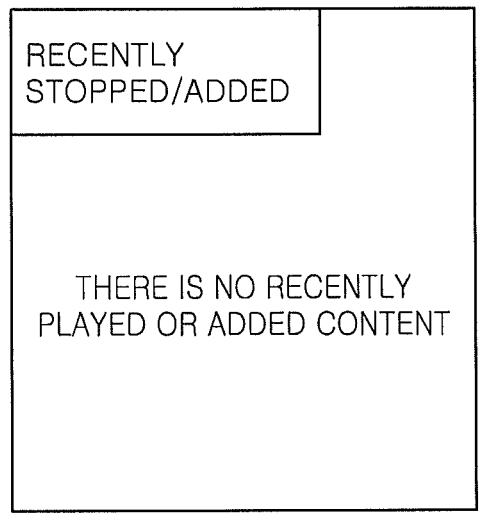

FIGS. 12 to 13 are views illustrating a method of displaying the recent contents list 630 corresponding to the 'RECENTLY STOPPED/ADDED' item according to embodiments.

Referring to FIG. 12, a 'CONTENTS SHARE' UI screen may include a 'History reset' button 661 for initializing a contents usage history. When the 'History reset' button 661 is selected, a popup window 670 for notifying that all items of 'RECENTLY STOPPED/ADDED' are deleted may be displayed on the screen 600.

In this case, when a user selects a 'confirm' button of the popup window 670, as shown in FIG. 13, all contents information is initialized in the recent contents list 630.

Figure 14:
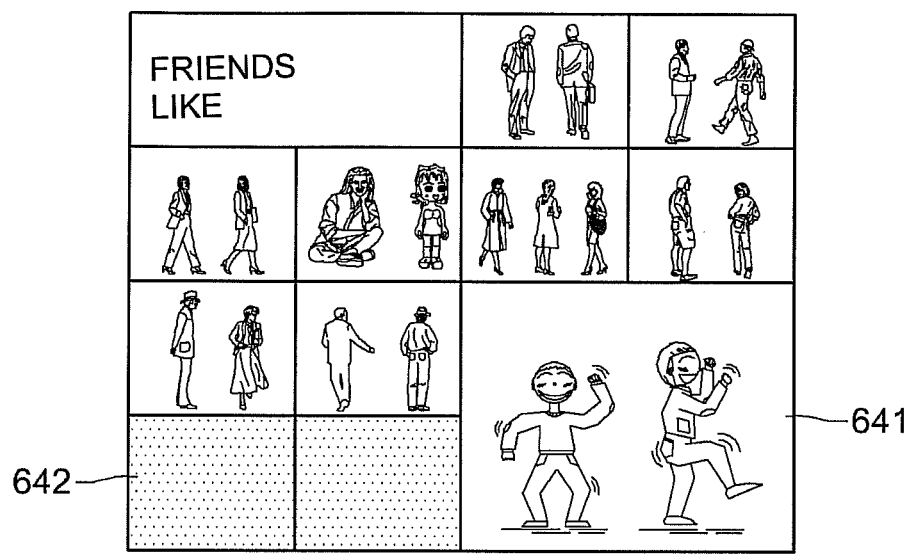
FIGS. 14 to 16 are views illustrating a method of displaying a 'FRIENDS LIKE' list shown in FIG. 8 according to embodiments.
Figure 15:
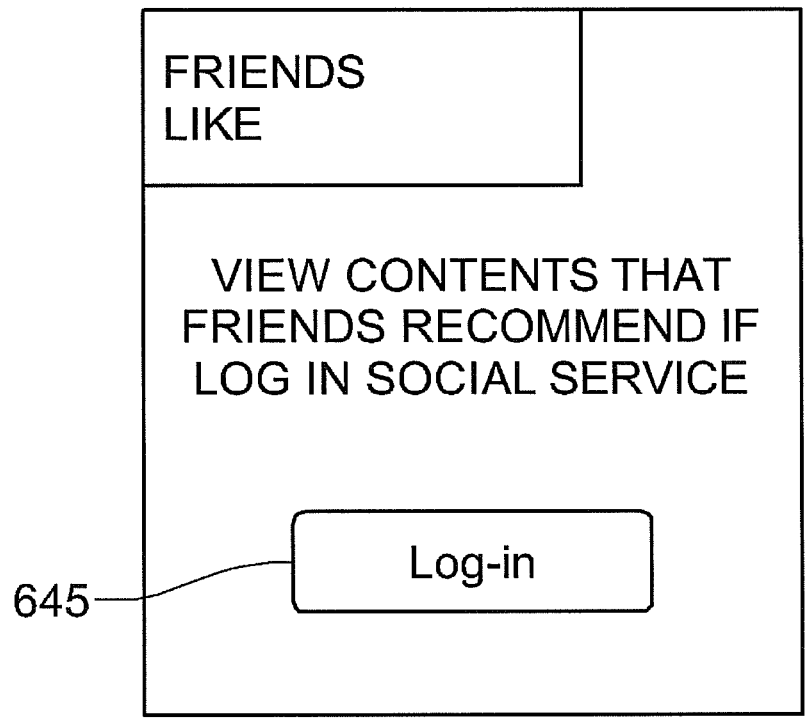
Figure 16:
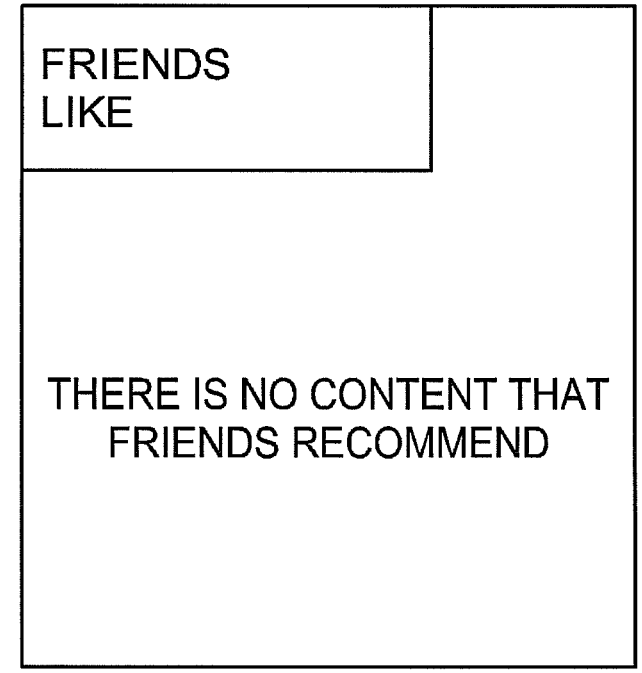

FIGS. 14 to 16 are views illustrating a method of displaying the recommended contents list 640 corresponding to the 'FRIENDS' LIKE' item according to embodiments.

Referring to FIG. 14, the network interface unit 135 of the image display device 100 may access a server providing a specific sharing service, which is preset during a device manufacturing process or set by a user. A user registered as a friend in a corresponding service may receive information on uploaded/downloaded or recommended contents.

The received information may include thumbnail images for each of the contents, and accordingly, the recommended contents list 650 may arrange and display thumbnail images for contents that a user, who is registered as a friend, uploads/downloads or recommends according to a time sequence in the contents sharing service.

Moreover, one content 641 among the contents in the recommended contents list 640 may be displayed as a larger image then other contents. When the number of contents that the user registered as a friend uploads/downloads or recommends is less than the number of contents displayable in the recommended contents list 640, some cells 642 may be dimmed without an additional image.

Referring to FIG. 15, when the image display device 100 is not logged in the contents sharing service, a 'Log-in' button 645 for logging in the contents sharing service may be displayed in the recommended contents list 640.

Referring to FIG. 16, when the image display device 100 is logged in the contents sharing service, if there are no contents that a user registered as a friend uploads/downloads or recommends, contents information may not be displayed in the recommended contents list 640.

Figure 17:
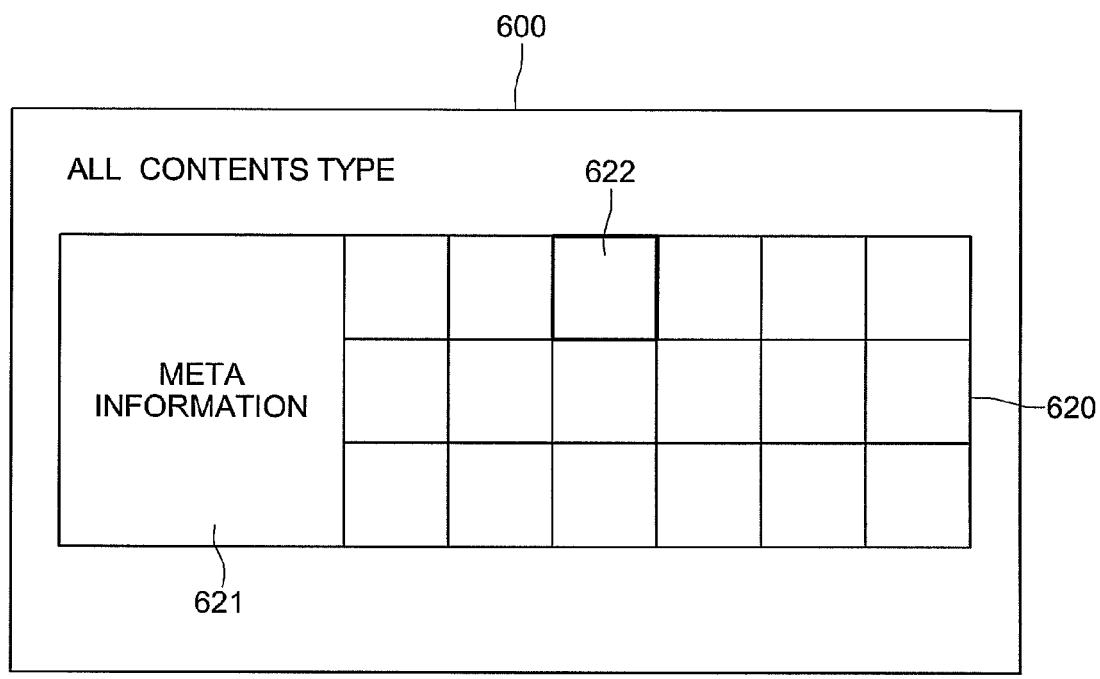
FIGS. 17 to 18 are views illustrating a method of displaying an 'ALL' list among 'CONTENTS TYPE' items shown in FIG. 8 according to embodiments.
Figure 18:
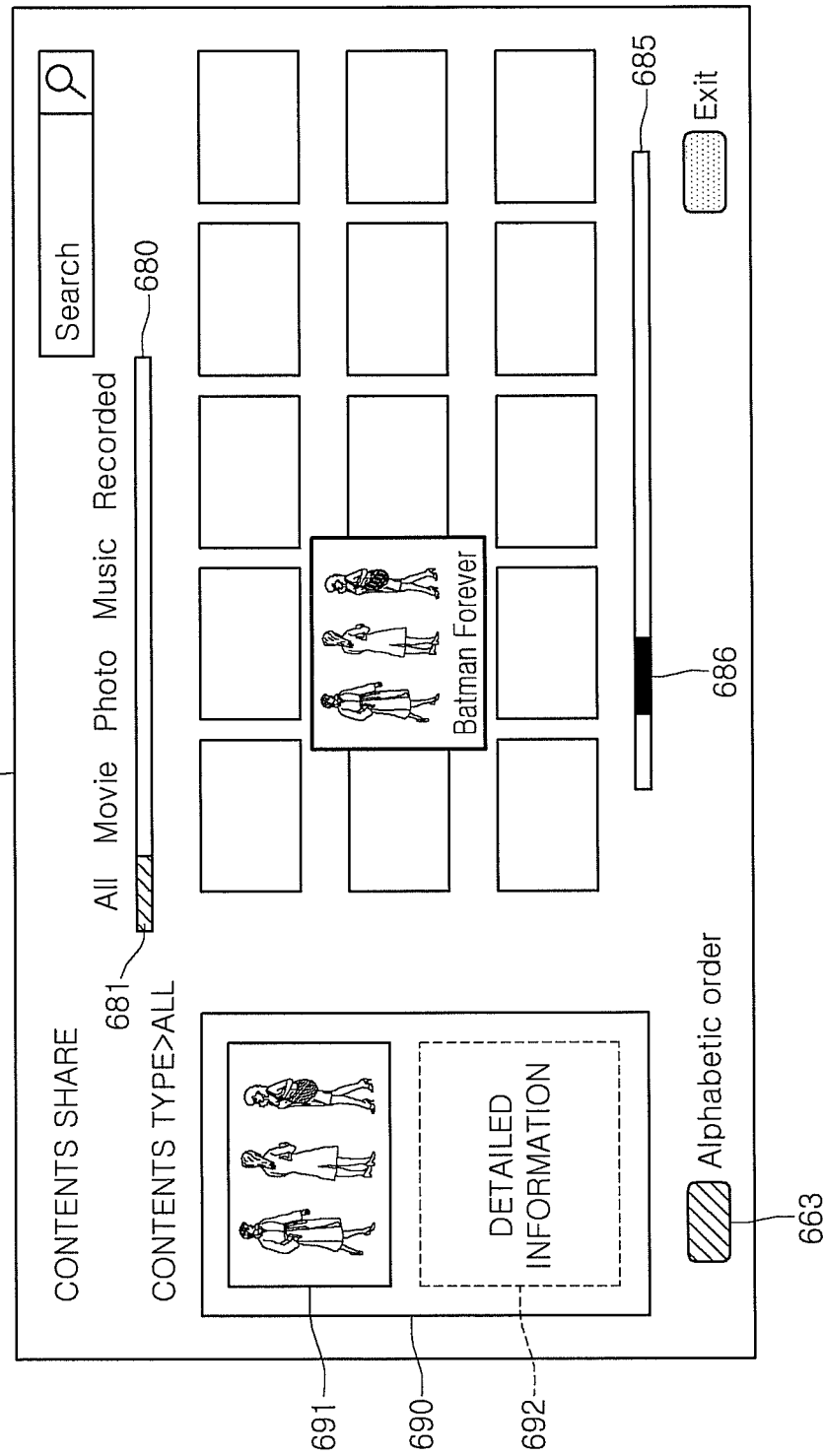

FIGS. 17 and 18 are views illustrating a method of displaying a contents list of an 'ALL' type among the 'CONTENTS TYPE' items according to embodiments.

Referring to FIG. 17, when a user selects an area having a 'CONTENTS TYPE' item displayed on the screen 600 of FIG. 8, a list 620 for entire contents provided from contents sources connectible to the image display device 100 may be displayed on the list 620.

Moreover, when one 622 of the contents in the contents list 620 is selected, meta information 621 on the selected content may be displayed on the screen 600 in addition to the contents list 620.

As described with reference to FIGS. 3 and 4, the meta information 621 may be information received from the SDP server 300 at the request of the image display device 100.

Moreover, in the case of music contents, album jackets, song titles, or singers may be provided as detailed information. In the case of photo contents, thumbnail images, file names, or shooting dates may be displayed. In the case of recordings, thumbnail images, titles, channels, recoding dates, or recording times may be displayed.

With a method of displaying the 'ALL' type contents list 620 described with reference to FIG. 18, when a 'Batman Forever' movie content 622 is selected from contents displayed on the screen 600, detailed information 692 on the selected movie content 622 may be displayed on a detailed information window 690 in addition to the thumbnail image 691.

The detailed information 692 on the movie content 622 may include information such as the title, director, actors, rating, review, impression, synopsis, or playing time of a corresponding movie. The above detailed information 692 may include metadata received from the SDP server 300.

Moreover, contents in the 'ALL' type contents list 620 may be arranged according to time order. When a user selects an 'Alphabetic order' button 663 displayed on the screen 600, the contents may be rearranged according to an alphabetic order of the corresponding contents titles.

The 'CONTENTS SHARE' UI of FIG. 18 may include a first scroll bar 680 by which a user can select a contents type.

For example, a user moves a scroll box 681 on the first scroll bar 680 by using the remote control device 200, in order to select a contents type corresponding to the position of the scroll bar 681.

Additionally, the 'CONTENTS SHARE' UI may include a second scroll bar 685 that allows a user to select a specific position of a contents list.

For example, a user moves a scroll box 685 on the second scroll bar 685 by using the remote control device 200, in order to display on the screen 600 a portion corresponding to the position of the scroll box 681 in the contents list.

That is, when the scroll box 686 on the second scroll bar 685 moves in one direction, a contents list on the screen 600 moves in a corresponding direction. Also, new contents in the contents list may be displayed on the screen 600.

Additionally, a user may recognize a rough position of a portion displayed on the current screen 600 in the contents list by using the position of the scroll box 686 on the second scroll bar 685.

FIGS. 19 to 22 are views illustrating a method of displaying a contents list of a 'MOVIE' type among the 'CONTENTS TYPE' items according to embodiments.

Figure 19:
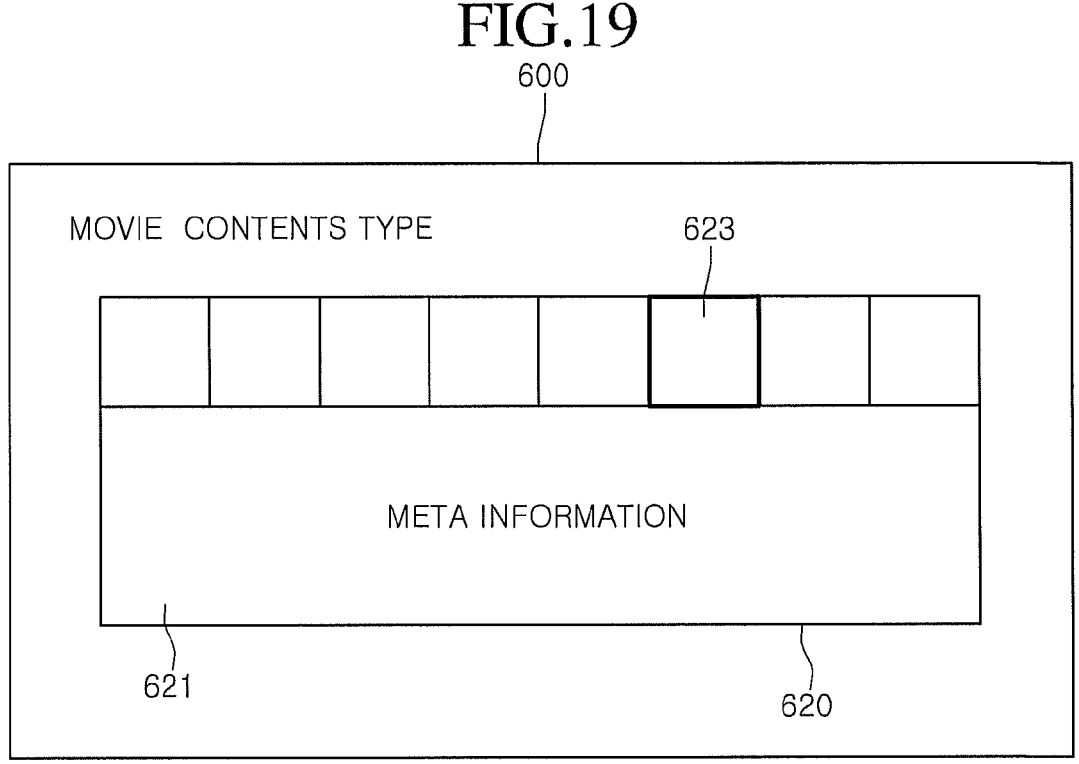
FIGS. 19 to 22 are views illustrating a method of displaying a 'MOVIE' list among 'CONTENTS TYPE' items shown in FIG. 8 according to embodiments.

Referring to FIG. 19, when a user selects a 'MOVIE' from a 'CONTENTS TYPE' item on the screen 600 of FIG. 8, among contents provided from a plurality of content sources connectible to the image display device 100, a movie contents list 620 may be displayed on the screen 600.

Moreover, when one 623 of the contents in the movie contents list 620 is selected, meta information 621 on the selected movie content 623 may be displayed on the screen 600 in addition to the contents list 620 received from the SDP server 300.

Figure 20:
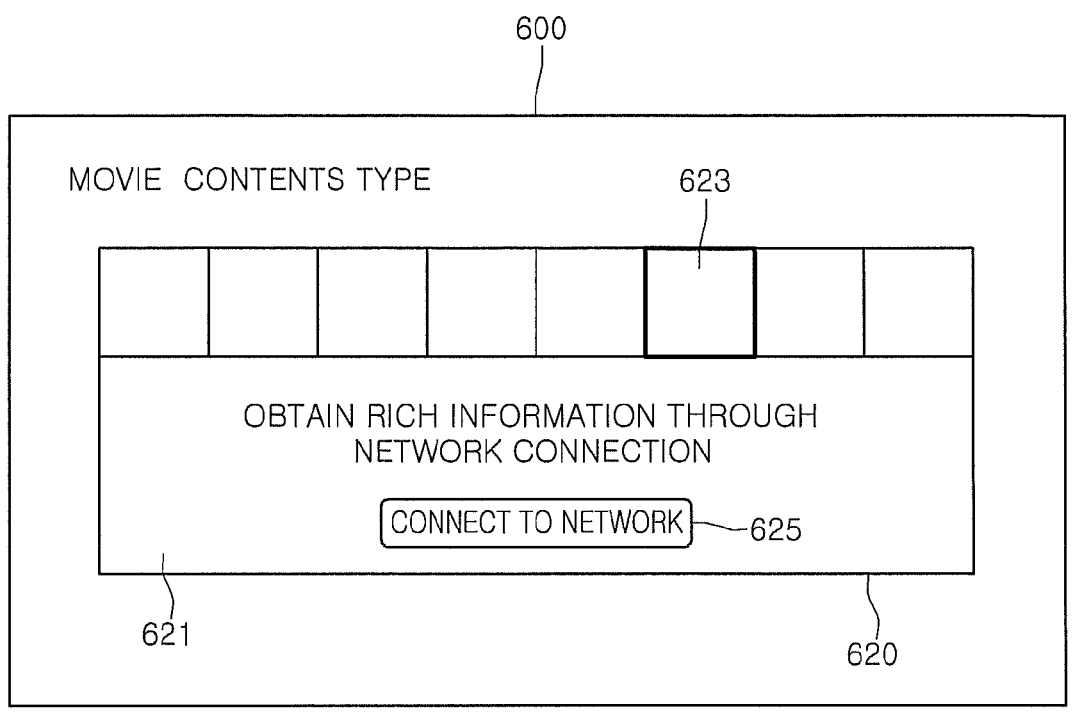

Referring to FIG. 20, if there is no connected network for the metadata transmission between the image display device 100 and the SDP server 300, a 'network connection' button 625 may be displayed on the screen 600 in order to provide a connection with the SDP server 300.

Figure 21:
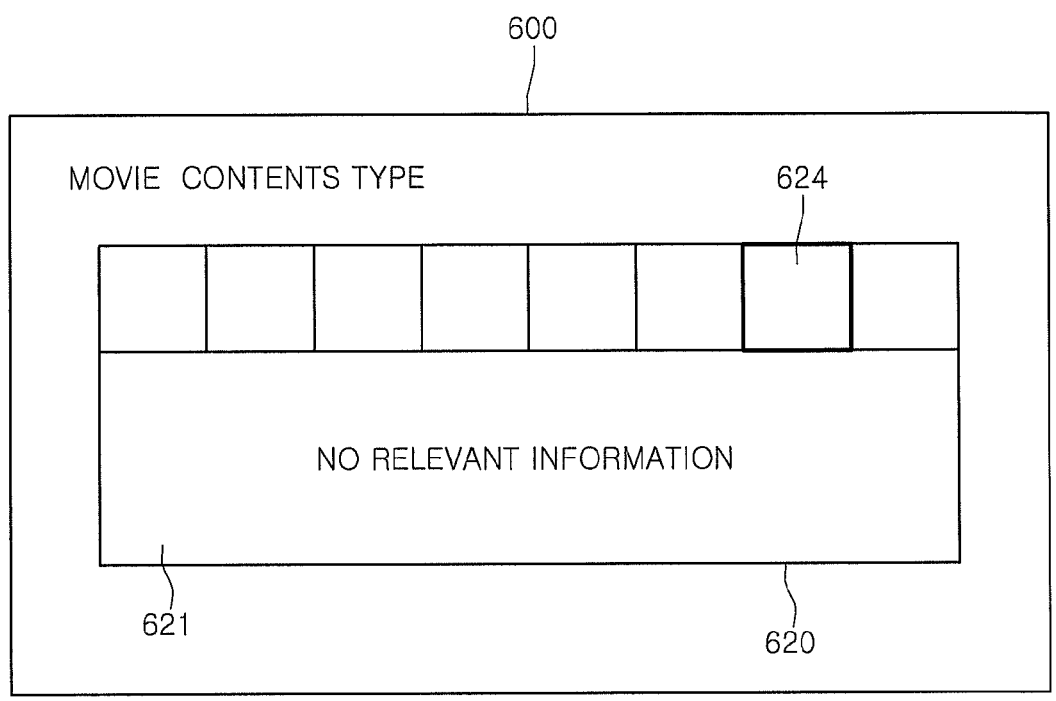

Moreover, no meta information on one content 624 selected from the movie contents list 620 is stored in the SDP server 300, and thus, as shown in FIG. 21, a message for notifying that there is no meta information on the selected movie content 624 may be provided to a user.

As mentioned above, when no network is connected or there is no meta information, contents related information that a file itself of movie contents, selected by a user, has may be displayed on an area 621 where meta information is displayed.

Figure 22:
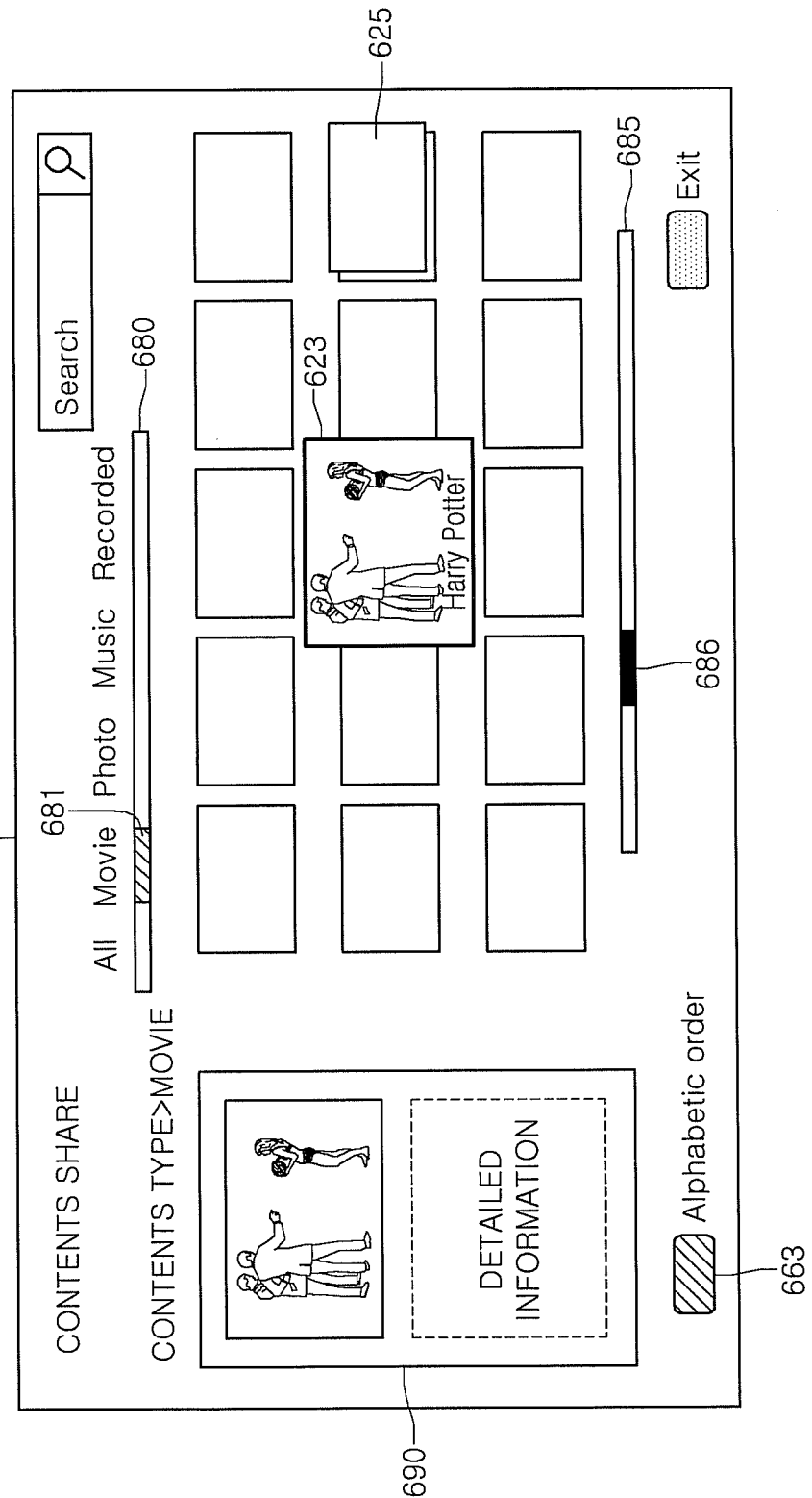

Referring to FIG. 22, a user moves the scroll box 681 on the first scroll bar 680 to a position corresponding to 'Movie', in order to display the movie contents list on the screen 600.

Moreover, series of contents in the movie contents list may be displayed on the screen 600 as one group contents 625.

Figure 23:
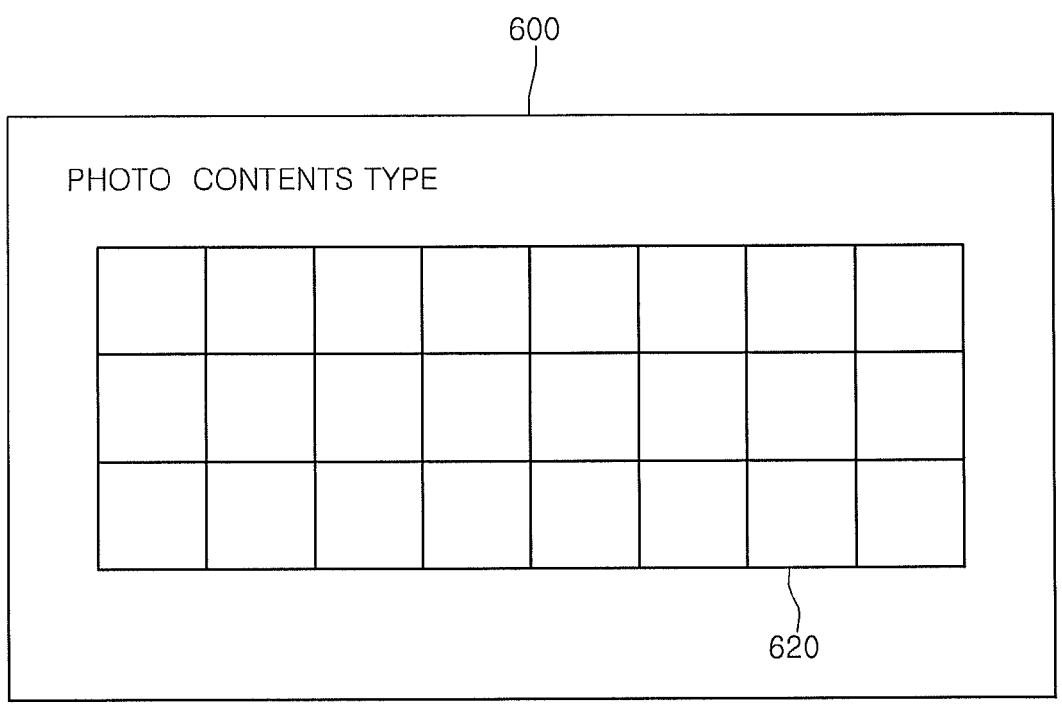
FIGS. 23 and 24 are views illustrating a method of displaying a 'PHOTO' list among 'CONTENTS TYPE' items shown in FIG. 8 according to embodiments.
Figure 24:
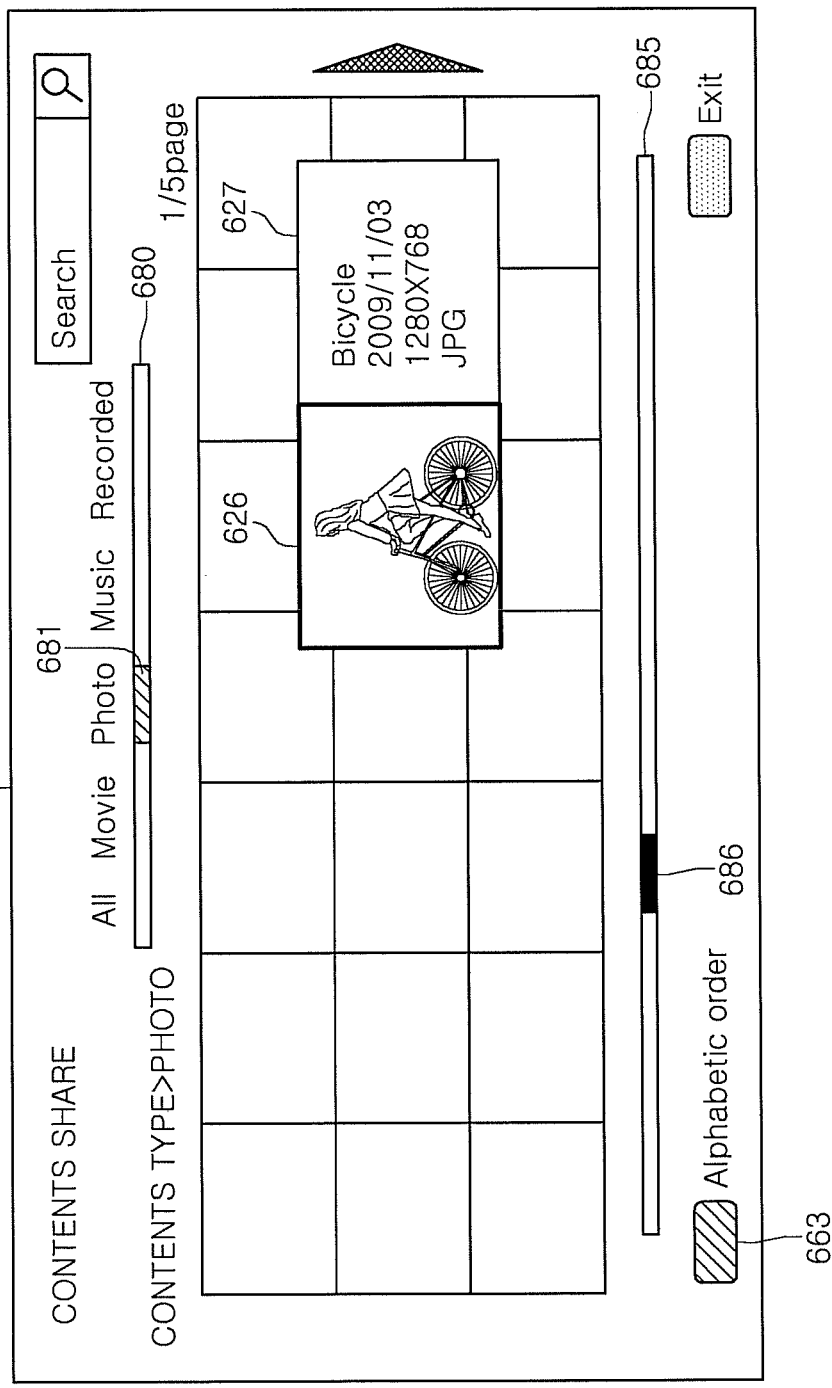

FIGS. 23 and 24 are views illustrating a method of displaying a contents list of a 'PHOTO' type among the 'CONTENTS TYPE' items according to embodiments.

Referring to FIG. 23, when a user selects a 'PHOTO' from a 'CONTENTS TYPE' item on the screen 600 of FIG. 8, among contents provided from a plurality of content sources connectible to the image display device 100, a photo contents list 620 including photo contents may be displayed on the screen 600.

Referring to FIG. 24, a user moves the scroll box 681 on the first scroll bar 680 to a position corresponding to 'Photo', in order to display the photo contents list on the screen 600.

Furthermore, when a user selects one photo content 626 in the photo contents list, information on the selected photo content 626 is displayed, and also information 627 on the file name, shooting date, size, and compression type of the photo content 626 may be displayed adjacent to the information on the one photo content 626.

Figure 25:
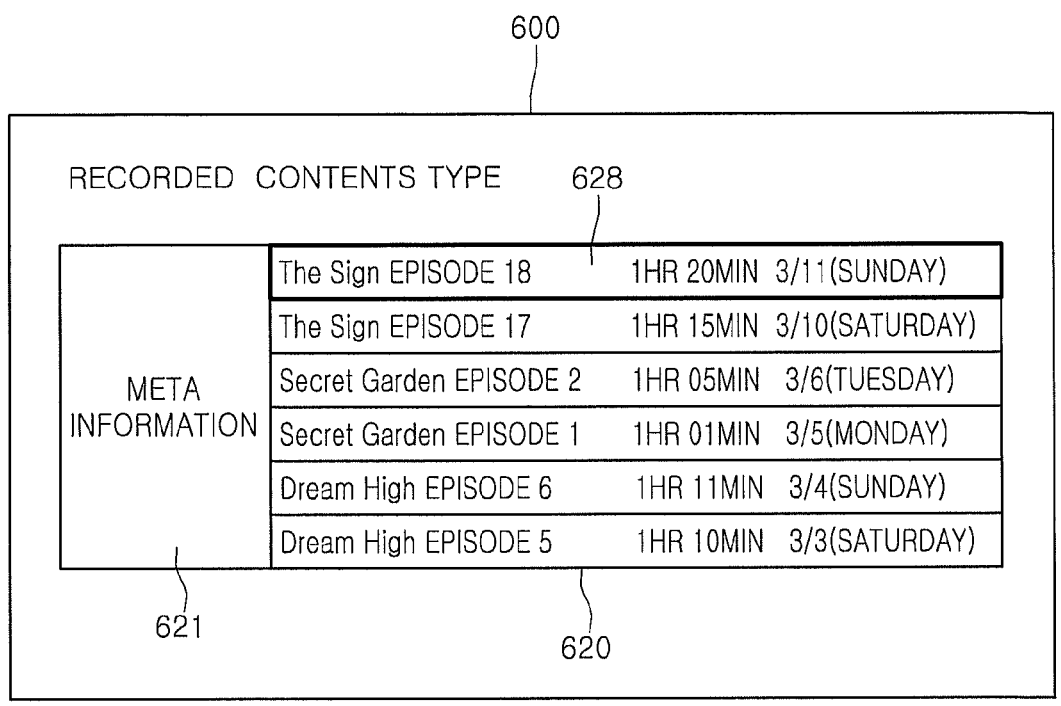
FIG. 25 is a view illustrating a method of displaying a 'RECORDED' list among 'CONTENTS TYPE' items shown in FIG. 8 according to embodiments.

FIG. 25 is a view illustrating a method of displaying a contents list of a 'RECORDED' type among the 'CONTENTS TYPE' items according to an embodiment.

Referring to FIG. 25, when a user selects a 'RECORDED' from a 'CONTENTS TYPE' item on the screen 600 of FIG. 8, a recordings list 620 may be displayed on the screen 600.

Moreover, when one recording 628 is selected from a recordings list displayed on the screen 600, meta information 621 on the selected recording 624 may be displayed.

Hereinafter, configurations and operations of the image display device 100 and the SDP server 300 will be described in more detail with reference to FIGS. 26 to 28.

Figure 26:
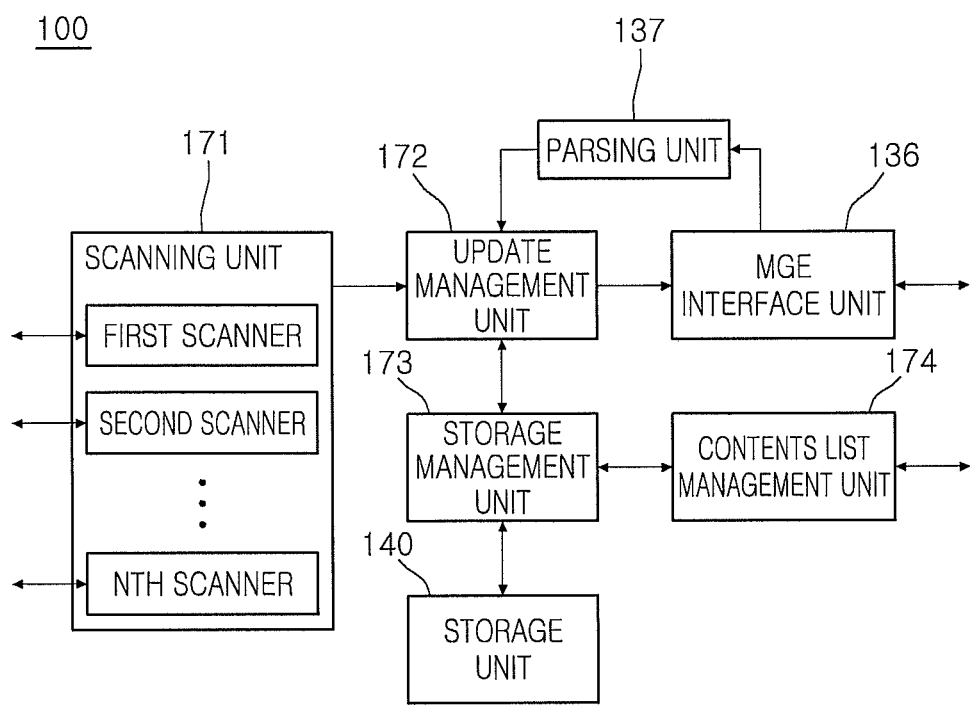
FIG. 26 is a block diagram illustrating a configuration of an image display device according to another embodiment.

FIG. 26 is a block diagram illustrating a configuration of an image display device according to another embodiment. That is, a configuration of the control unit 170 in the image display device 100 is illustrated according to an embodiment. Overlapping descriptions for operations of the image display devices 100 of FIG. 26 and FIGS. 1 to 25 will be omitted.

Referring to FIG. 26, a scanning unit 171 searches for contents in each of a plurality of contents sources, and an update management unit 172 obtains information on changed contents among the searched contents.

For this, the scanning unit 171 includes a plurality of scanners respectively corresponding to a plurality of contents sources, and scans and searches for contents in each corresponding external device.

For example, the scanning unit 171 may include a USB File Scanner, a DLNA File Scanner, and a Metadata Scanner, which respectively correspond to a USB device, a DLNA server, and a media server.

In more detail, the USB file scanner accesses a USB device connected to the image display device 100 through a USB Plug in/out Manager, and searches for contents stored in the USB device.

Additionally, the DLNA file scanner receives an event message through a DLNA status manager using UpnP when a network between the image display device 100 and a DLNA server is connected or disconnected, and searches for contents in the eDLNA server by using HTTP protocol.

Moreover, the metadata scanner receives an event message through a DLNA status manager using mDNS when a network is connected or disconnected, and searches for contents in the media server by using HTTP protocol.

Also, the control unit 140 may further include a USB DVR manager (not shown). The USB DVR manager may search for contents stored in an Electronic DataBase Management System (EDBMS).

Then, information on the searched contents may be delivered to the update management unit 172.

An MGE interface unit 136 may request the transmission of meta information on movie contents among the searched contents to the SDP server 300, and then, may receive an eXtensible MarkUp Language (XML) file including the meta information from the SDP server 300.

Furthermore, a parsing unit 137 parses the received XML file in order to obtain meta information on the movie contents, and then delivers the meta information to the update management unit 172.

Accordingly, the update management unit 172 obtains information on the contents searched from a plurality of contents sources and meta information matching some of the contents (for example, movie contents), and the matched contents information and meta information may be stored in the storage unit 140 through the storage management unit 173.

The contents list management unit 174 constructs a contents list by using the contents information and meta information stored in the storage unit 140, and the constructed contents list is delivered to the display unit 180 in order to be displayed on the screen 600 of the image display device 100.

According to an embodiment, the scanning unit 171 confirms whether contents information on each of a plurality of contents sources is changed (for example, contents addition, deletion, or modification) by using a plurality of scanners, and searches for all contents again in a corresponding contents source when the contents information is changed in order to deliver a contents list to the update management unit 172.

Moreover, the update management unit 172 obtains information on the changed contents by confirming the contents list delivered from the scanning unit 171. In addition to stored time information, the changed contents information may be stored in the storage unit 140 through the storage management unit 173. The stored time information may represent a time at which the contents information is stored in the storage unit 140.

In this case, the contents list management unit 174 may update a previously-constructed list according to recently added, deleted, or modified contents information by using the contents information and stored time information stored in the storage unit 140.

Additionally, when contents in the contents list are played, time information on the contents playback stop may be stored in the storage unit 140, and accordingly, the contents list management unit 174 may update a previously constructed contents list according to recent playback information.

According to an embodiment, the image display device 100 and the SDP server 300 may communicate with each other through Representational state transfer (REST), and the MGE interface unit 136 of the image display device 100 may transmit the name of a contents file to the SDP server 300 through HTTP, thereby requesting the transmission of meta information on corresponding contents.

For example, the meta information transmission request from the MGE interface unit 136 of the image display device 100 to the SDP server 300 may have a format such as 'http:// IP address/specific path?query=filename (including extension)'.

Then, the following is the case that the image display device 100 requests meta information on movie contents having an 'avartar.avi' file name to the SDP server 300.

http://x.x.x.x:8080/SmartShareModule/api/search.xml?query=avatar.avi

Figure 27:
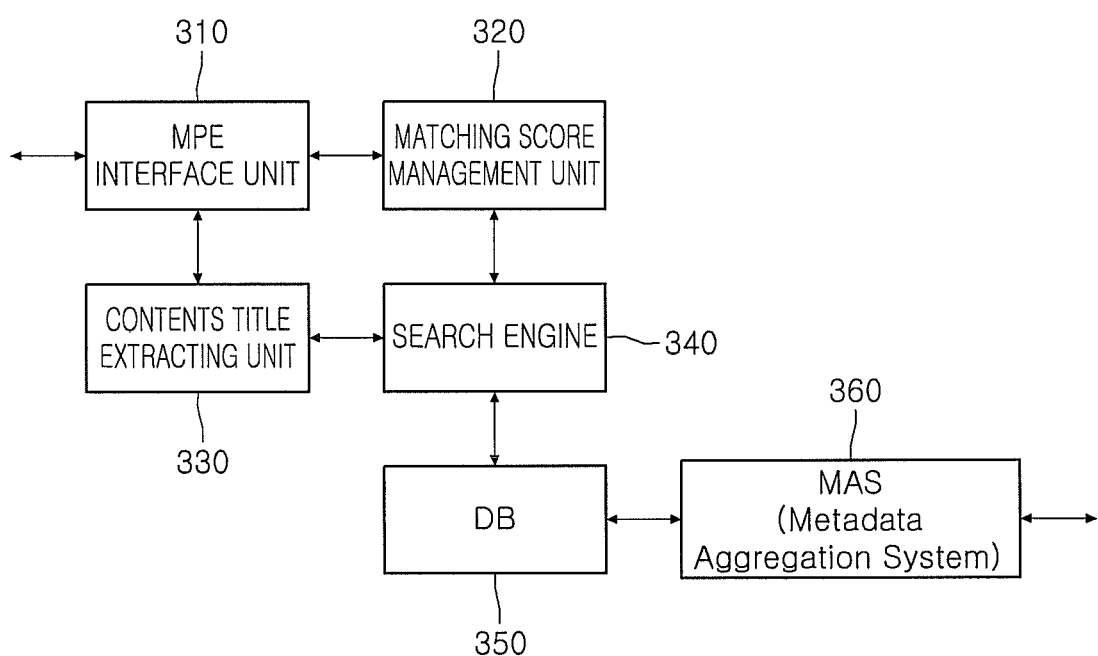
FIG. 27 is a block diagram illustrating a configuration of a SDP according to an embodiment.

FIG. 27 is a block diagram illustrating a configuration of a SDP according to an embodiment. Overlapping descriptions for operations of the SDP servers of FIG. 27 and FIGS. 1 to 26 will be omitted.

Referring to FIG. 27, the MGE interface unit 136 of the SDP server 300 receives the name of a contents file from the image display device 100 through HTTP. A Contents Title extracting unit 330 separates and extracts an actual title (for example, a movie title) from the file name received from the image display device 100.

Moreover, a search engine 340 may search a DB 350 for meta information on corresponding contents by using the contents title extracted from the Contents Title extracting unit 330.

According to an embodiment, the search engine 340 reads updated meta information from the DB 350 periodically, and then indexes the read meta information in order to store it in a memory (not shown).

In this case, the search engine 340 does not directly search the DB 350 for the contents title extracted from the Contents Title extracting unit 330, but searches the meta information by first using indexing information stored in the memory, so that search speed and accuracy on meta information may be improved.

A Metadata Aggregation System (MAS) 360 receives meta information on various contents periodically from SPs, and parses the received meta information to store it in the DB 350.

Additionally, a Matching Score calculating unit 320 may detect meta information that is the most corresponding to a corresponding contents file from the search results inputted from the search engine 340, and for this, a Levenshtein distance algorithm may be used.

Then, the MGE interface unit 310 constructs the meta information detected by the Matching Score calculating unit 320 with XML, and transmits the XML to the image display device 100 through HTTP, so that a response to the metal information transmission request from the image display device 100 may be completed.

FIG. 28 is a view illustrating a configuration of metadata transmitted from a SDP server to an image display device according to an embodiment.

Referring to FIG. 28, in response to the meta information transmission request of the image display device 100, the MGE interface unit 310 of the SDP server 300 may include the obtained meta information in XML, and then, provides it to the image display device 100.

For example, the MGE interface unit 310 constructs the XML of FIG. 28 by using items of the meta information and a meta information value corresponding to each item, and then, transmits the constructed XML to the image display device 100 through HTTP.

The method of managing contents according to the present invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices, and also include carrier waves (such as data transmission through the Internet).

The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of managing contents, the method comprising:
obtaining, by a video display device, contents information from each of a plurality of contents sources;
displaying, by the video display device, the obtained contents information on a screen as a plurality of contents lists, wherein one from among the plurality of contents lists includes a plurality of thumbnail images corresponding to a plurality of contents provided from the plurality of contents sources;
requesting, by the video display device, meta information on at least one content in a contents list to a service provider;
receiving, by the video display device, the meta information from the service provider; and
displaying, by the video display device, the received meta information in correspondence to the content, wherein the meta information includes detailed information of the content,
each of the plurality of contents sources is different from the service provider,
each of the plurality of contents sources is a peripheral device connected to the video display device, and
the meta information is remotely received from the service provider, wherein the method further comprises:
displaying, on the screen, the plurality of thumbnail images corresponding to the plurality of contents recently played on the video display device,
wherein a size of a thumbnail image corresponding to the most recently played content, among the plurality of thumbnail images, is larger than sizes of other ones of the plurality of thumbnail images.

2. The method according to claim 1, wherein the obtaining of the contents information comprises:
searching for contents in each of the plurality of contents source; and
storing information on changed contents among the searched contents in a database together with stored time information.

3. The method according to claim 2, wherein the contents list is updated using the contents information and the stored time information stored in the database.

4. The method according to claim 1, wherein the obtaining of the contents information comprises storing time information on stopping playback of contents when the contents in the contents list are played.

5. The method according to claim 1, wherein the plurality of contents lists comprises at least one of recommended contents lists, recently-played contents lists, recently-added contents lists, preferred contents lists, and contents types lists.

6. The method according to claim 1, wherein the meta information comprises at least one of titles, grades, ratings, actors, plots, and playing times of the contents.

7. The method according to claim 1, wherein the service provider includes a Service Delivery Platform (SDP) server.

8. The method according to claim 7, wherein the video display device and the SDP server communicate with each other through Representational State Transfer (RESET).

9. The method according to claim 7, further comprising transmitting a file name of the contents to the SDP server through HyperText Transfer Protocol (HTTP).

10. The method according to claim 1, wherein the plurality of contents sources comprise at least one of a storage device equipped in or connected to the image display device, a Network-Attached Storage (NAS), a Digital Living Network Affiance (DLNA) server, and a media server.

11. A video display device comprising:
a storage unit for storing contents information;
a control unit for obtaining the contents information from each of a plurality of contents sources;
a display unit for displaying a plurality of constructed contents lists on one screen together with meta information on at least one content, wherein one, from among the plurality of contents list, includes a plurality of thumbnail images corresponding to a plurality of contents provided from the plurality of contents sources; and
a network interface unit for requesting meta information on at least one content in a contents list to a service provider and receiving the meta information from a service provider, wherein the meta information includes detailed information of the content,
each of the plurality of contents sources is different from the service provider,
each of the plurality of contents sources is a peripheral device connected to the video display device, and
the meta information is remotely received from the service provider,
wherein the control unit is further configured to:
control the display unit to display, on the screen, the plurality of thumbnail images corresponding to the plurality of contents recently played on the video display device,
wherein a size of a thumbnail image corresponding to the most recently played content, among the plurality of thumbnail images, is larger than sizes of other thumbnail images.

12. The device according to claim 11, wherein the control unit comprises:
a scanning unit for searching for contents in each of the plurality of contents sources;
an update management unit for obtaining information on changed contents among the searched contents;
a storage management unit for storing information on the changed contents in the storage unit together with stored time information; and
a contents list management unit for updating the contents list by using the contents information and the stored time information stored in the storage unit.

13. The device according to claim 11, wherein the control unit stores time information on stopping playback of contents in the storage unit when the contents in the contents list are played.

14. The device according to claim 11, wherein the plurality of contents list comprises at least one of recommended contents list, recently-played contents list, recently-added contents list, preferred contents list, and contents types list.

15. The device according to claim 11, wherein the meta information comprises at least one of titles, grades, ratings, actors, plots, and playing times of the contents.

16. The device according to claim 11, wherein the network interface unit comprises:
an interface unit for receiving an eXtensible MarkUp Language (XML) file including the meta information from a SDP server by requesting transmission of the meta information to the SDP server; and
a parsing unit for obtaining the meta information by parsing the received XML file.

17. The device according to claim 16, wherein the interface unit transmits a file name of the contents to the SDP server through HTTP.

18. The device according to claim 11, wherein the screen includes a first scroll bar used for selecting the content type by using a remote control device and a second scroll bar used for selecting a specific content in the content list by using the remote control device, and
when the specific content is selected by using the first scroll bar and the second scroll bar, a thumbnail image of the specific content and detailed information on the specific content are displayed on the screen.

* * * * *